(12) United States Patent
Rune

(10) Patent No.: US 7,869,405 B2
(45) Date of Patent: Jan. 11, 2011

(54) ARRANGEMENTS AND METHOD FOR HANDLING MACRO DIVERSITY IN UTRAN

(75) Inventor: Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 568 days.

(21) Appl. No.: 10/583,617

(22) PCT Filed: Feb. 4, 2004

(86) PCT No.: PCT/SE2004/000144

§ 371 (c)(1),
(2), (4) Date: Dec. 2, 2008

(87) PCT Pub. No.: WO2005/062495

PCT Pub. Date: Jul. 7, 2005

(65) Prior Publication Data

US 2009/0219886 A1    Sep. 3, 2009

(30) Foreign Application Priority Data

Dec. 22, 2003   (SE) .................................. 0303462

(51) Int. Cl.
*H04W 4/00* (2009.01)
(52) U.S. Cl. ................ 370/331; 370/206; 370/240; 370/335; 370/332; 455/522; 455/69; 455/436
(58) Field of Classification Search ................ 370/331, 370/206, 340, 335, 332; 455/522, 69, 436
See application file for complete search history.

(56) References Cited

U.S. PATENT DOCUMENTS

| | | | | |
|---|---|---|---|---|
| 5,103,459 A | * | 4/1992 | Gilhousen et al. ........... 370/206 |
| 6,181,738 B1 | * | 1/2001 | Chheda et al. ............. 375/224 |
| 6,222,830 B1 | * | 4/2001 | Padovani et al. ............ 370/332 |
| 6,226,283 B1 | * | 5/2001 | Neumiller et al. .......... 370/340 |
| 6,285,887 B1 | * | 9/2001 | Mimura ...................... 455/522 |

(Continued)

FOREIGN PATENT DOCUMENTS

WO           01/41482          6/2001

(Continued)

OTHER PUBLICATIONS

International Search Report for PCT/SE2004/000144 dated Oct. 1, 2004, 3GPP TS 25.402 V.5.2.0 (Jun. 2003).

*Primary Examiner*—David Q Nguyen
(74) *Attorney, Agent, or Firm*—Nixon & Vanderhye P.C.

(57) ABSTRACT

A Diversity Handover, DHO, node is adapted to execute a macro diversity functionality in a mobile telecommunication system. The DHO node performs an uplink combining of Dedicated Channel, DCH, frames. The DHO node estimates the size of an adaptive receive window for receiving the DCH frames. The adaptive receive window includes a starting point, denoted ref, and an end point for receiving a next DCH frame or a next set of DCH frames to be combined having a Connection Frame Number n, $CFN_n$, based on the Time of Arrival, ToA, of a previous frame or a previous set of frames having a $CFN_{n-1}$. The adaptive receive window is adjusted by changing its end point for a new frame or a new set of frames in accordance with the estimated size.

35 Claims, 11 Drawing Sheets

U.S. PATENT DOCUMENTS

| | | | |
|---|---|---|---|
| 6,307,849 B1* | 10/2001 | Tiedemann, Jr. | 370/335 |
| 6,628,924 B1* | 9/2003 | Miyamoto | 455/69 |
| 7,082,302 B1* | 7/2006 | Maitland et al. | 455/436 |
| 7,240,175 B1* | 7/2007 | Maitland et al. | 711/167 |
| 2005/0130690 A1* | 6/2005 | Shinozaki | 455/522 |

FOREIGN PATENT DOCUMENTS

| | | |
|---|---|---|
| WO | 02/47424 | 6/2002 |
| WO | 03/096733 | 11/2003 |

\* cited by examiner

US 7,869,405 B2

ARRANGEMENTS AND METHOD FOR HANDLING MACRO DIVERSITY IN UTRAN

This application is the US national phase of international application PCT/SE2004/000144 filed 4 Feb. 2004, which designated the U.S. and claims priority to SE 0303462-6 filed 22 Dec. 2003, the entire contents of each of which are hereby incorporated by reference.

TECHNICAL FIELD

The present invention relates to arrangements and method in a third generation mobile telecommunication system and evolved variants thereof. In particular, the invention relates to arrangements and method for handling timing of the combining procedure in conjunction with certain aspects of macro diversity in a UMTS Radio Access Network (UTRAN) transport network.

BACKGROUND

Third generation (3G) mobile communication systems (e.g. Universal Mobile Telecommunications System (UMTS)) shall offer high quality voice and data services for mobile users. The systems shall also provide high capacity and universal coverage. In some situations that may however be difficult to fulfil, due to unreliable radio channels. One promising technique to combat link reliability problems over the radio interface is macro diversity techniques. Macro diversity should however also be seen as an inherent consequence of using Code Division Multiple Access (CDMA) as the multiple access technique in a cellular network. CDMA is an interference limited technology. That is, it is the interference in a cell that sets the upper limit for the cell's capacity. To keep the interference as low as possible it is essential that the base station controls the output power of the radio transmitters of the mobile terminals in the cell, i.e. fast and efficient power control is essential. As a mobile terminal moves towards the periphery of a cell it has to increase the power of its radio transmission in order for the base station to be able to receive the transmitted signal. Likewise, the base station has to increase the power of its radio transmission towards the mobile terminal. This power increase has a deteriorating effect on the capacity of both the mobile terminal's own cell and the neighbouring cell(s) which the mobile terminal is close to. Macro diversity is used to mitigate this effect. When the mobile terminal communicates via more than one base station, the quality of the communication can be maintained with a lower radio transmission power than when only a single base station is used. Thus, macro diversity is both a feature raising the quality of unreliable radio channels and a necessity that is required in order to overcome an inherent weakness of CDMA based cellular systems.

FIG. 1 illustrates a UTRAN. The Radio Network Controller (RNC) 102 is connected to the Core Network 100 that in turn may be connected to another network. The RNC 102 is connected to one or more Node Bs 104 also denoted base stations via a transport network 106. The transport network 106 may e.g. be IP-based or ATM-based. The Node Bs 104 may be wirelessly connected to one or several User Equipments (UEs) 110 also denoted mobile terminals. A Serving-RNC (S-RNC) 102 is a RNC that has a Radio Resource Connection (RRC) connection with the UE 110. A Drift-RNC (D-RNC) 112 is a RNC that may be connected to a UE 110, but where another RNC 102, i.e. the S-RNC, handles the RRC connection with the UE 110.

Macro diversity enables a mobile station to communicate with a fixed network by more than one radio link, i.e. a mobile can send/receive information towards/from more than one radio port (or base station also denoted Node B). The radio ports (RPs) are spatially separated at distance from a short distance, e.g. between different floors in a building, (picocells) up to about some kilometres (micro- and macro-cells). As the propagation conditions between the mobile terminal and the different RPs, are different at the same moment in time, the resulting quality of the combination of the received signals is often better than the quality of each individual signal. Thus, macro diversity can improve radio link quality. When a mobile terminal is connected to more than one base station simultaneously, the UE is said to be in soft handover.

Macro diversity is applicable only to dedicated channels (DCH). Currently all the macro diversity functionality resides in the RNC provided that the corresponding functionality for softer handover in Node B is not considered. Softer handover implies that a UE has two or more radio links to the same Node B. The softer handover combining performed in the uplink in the Node B is more advanced than the selective combining performed in the RNC. In the downlink, the splitting is performed in the RNC, which ensures that a copy of each downlink DCH FP frame is sent through each leg in the active set of the concerned DCH. Both DCH FP data frames and DCH FP control frames are subject to the splitting function.

In the uplink, the RNC performs the combining, which is more complicated than, the splitting. Only DCH FP data frames are subject to the combining procedure. DCH FP control frames are not combined, since each uplink DCH FP control frame includes control data that is specific for an individual Node B. For the uplink, the RNC has a time window in which all legs are expected to deliver their contribution to the combining (i.e. a DCH FP frame with a certain Connection Frame Number (CFN)). At the expiration of the time window, all the DCH FP frames with the correct CFN that were received within the time window are passed to the combining function.

The actual combining is a selection of the best piece of data out of the candidates that were received through the different legs. For non-voice DCHs, the unit of selection is a transport block (TB). To determine which of the candidates to select for a certain transport block, the CRCI for the concerned TB is checked in each of the delivered frames. If one and only one of them indicates that the TB was correctly received at the Node B (i.e. that the CRC check was successful for the concerned TB when it was received by the Node B), this TB is selected. Otherwise, if more than one of the CRCIs indicate successful CRC check, the combining function selects the one of these TBs that belongs to the frame with the greatest Quality Estimate (QE) parameter. The QE parameter is a measure of the current bit error rate over the radio interface. Likewise, if all of the CRCIs indicate unsuccessful CRC check, the combining function selects the TB from the frame with the greatest QE parameter. If in the two latter cases, the greatest QE parameter value is found in two or more of the frames (i.e. if these QE parameters are equal too), the selection of TB is implementation dependent. FIG. 2 illustrates the combining procedure for non-voice DCHs.

For voice DCHs, the combining works slightly differently. The Adaptive Multi Rate (AMR) speech codec produces three subflows, wherein each are transported in a respective DCH. These three DCHs are so-called coordinated DCHs. The coordinated DCHs are included in the same DCH FP frame and there is only one TB for each subflow in a frame. During the combining, the combining function does not select separate TBs from different candidate frames to create a new combined frame as described above in the context of non-voice DCHs. Instead it selects one entire frame based on the CRCI for the TB associated with subflow 1, which is the most significant subflow. The CRCI of the other subflows are insignificant, since these subflows are not CRC protected over the radio interface. Again, if the CRCIs indicated unsuccessful CRC check or because all of the concerned CRCIs indicate unsuccessful CRC check, the frame with the greatest QE parameter is selected. FIG. 3 illustrates the combining procedure for voice DCHs.

Hence macro diversity in current UTRANs is realised through macro diversity functionality, also denoted as Diversity Handover (DHO) functionality in the RNCs. The current standards allow DHO functionality in both the Serving RNC (S-RNC) and the D-RNC, but the possibility to locate the DHO functionality in the D-RNC is commonly not used.

Thus, a problem in the existing macro diversity solutions is that the split downlink flows and the uncombined uplink flows of user data are transported all the way between the RNC and the Node B. That results in that costly transmission resources are consumed in the UTRAN transport network, which also results in significant costs for the operators.

SUMMARY

The problem is solved by distributing the macro diversity functionality from the RNC to another node in the UTRAN closer to the mobile terminal. The node is referred to as a Diversity Handover (DHO) enabled node and may be a node in the UTRAN transport network such as a router or a Node B or even a future type of node, e.g. a specialised DHO node. Thus the splitting and combining of the traffics flows may be performed in a router in the transport network or in a Node B. The macro diversity functionality may also be distributed to more than one such other node so that several splitting and combining nodes are interconnected in a way that a hierarchical tree of macro diversity data flows is formed.

However, when the macro diversity functionality, also referred to as DHO functionality, is distributed to other nodes than the RNCs, possibly in a hierarchical fashion, a problem arises in conjunction with the timing of the uplink combining procedure.

Thus, an object is to achieve a method and arrangements for solving the problem of the timing of the uplink combining procedure.

An important advantage achieved is transmission savings in the UTRAN transport network, which translate into significant cost savings for the operator. The transmission savings are realised through optimised location of the DHO functionality. Thereby the redundant data transport is eliminated in the parts of the path, where data pertaining to different macro diversity legs of the same DCH would otherwise be transported in parallel along the same route.

Another advantage is that RNCs may be located in more central locations of the network (i.e. with less geographical distribution). The main purpose of the current common geographical distribution of RNCs is to limit the transmission costs for the parallel macro diversity legs. When this parallel data transport is eliminated, it becomes more beneficial for an operator to centralise the RNCs, e.g. by co-locating them with Mobile Switching Centres (MSCs) or Media Gateways (MGWs). Co-locating several nodes on the same site results in simplified operation and maintenance, which also means reduced costs for the operator.

DETAILED DESCRIPTION

Figure 1:
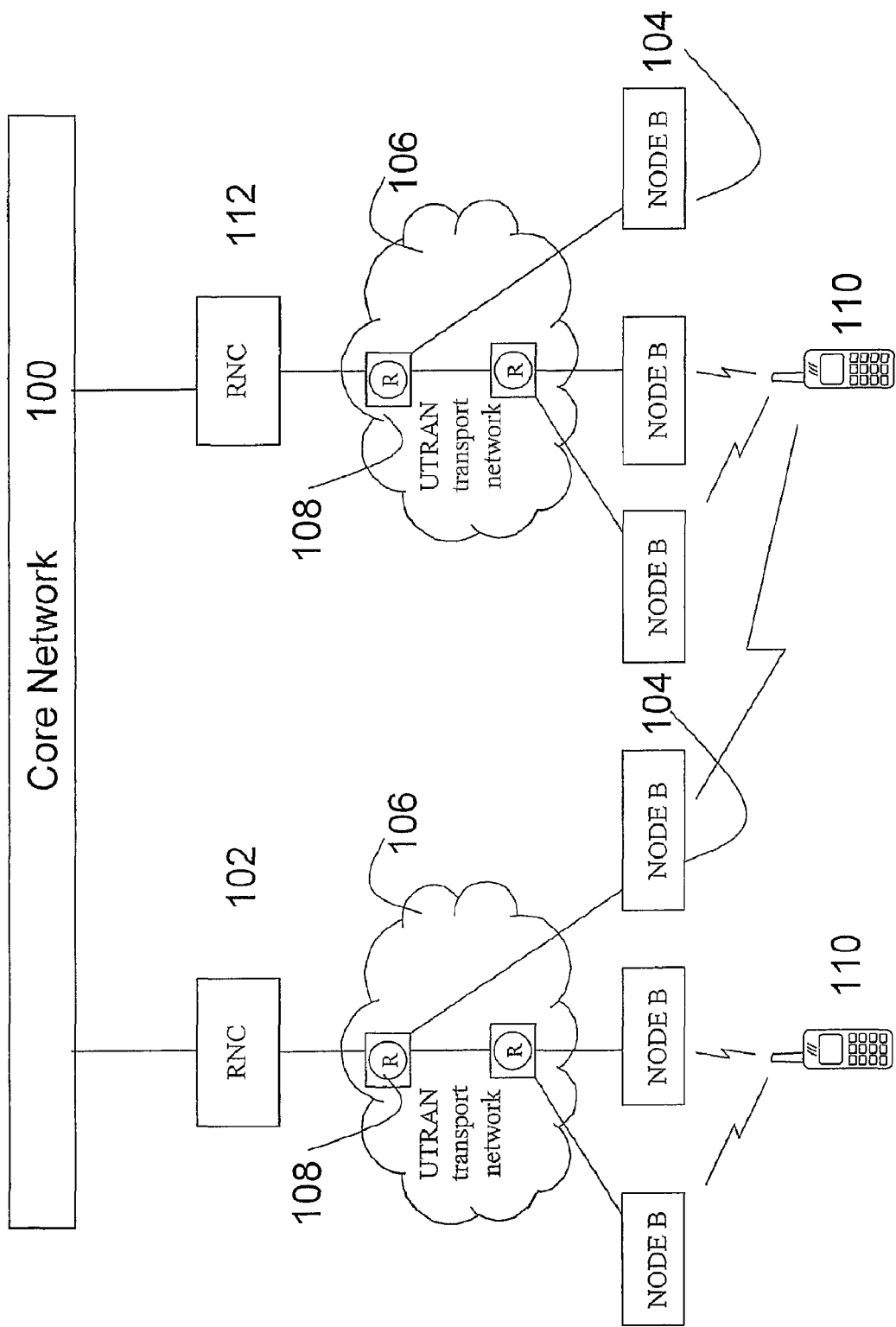
FIG. 1 is a schematic illustration of a UMTS Terrestrial Radio Access Network.
Figure 2:
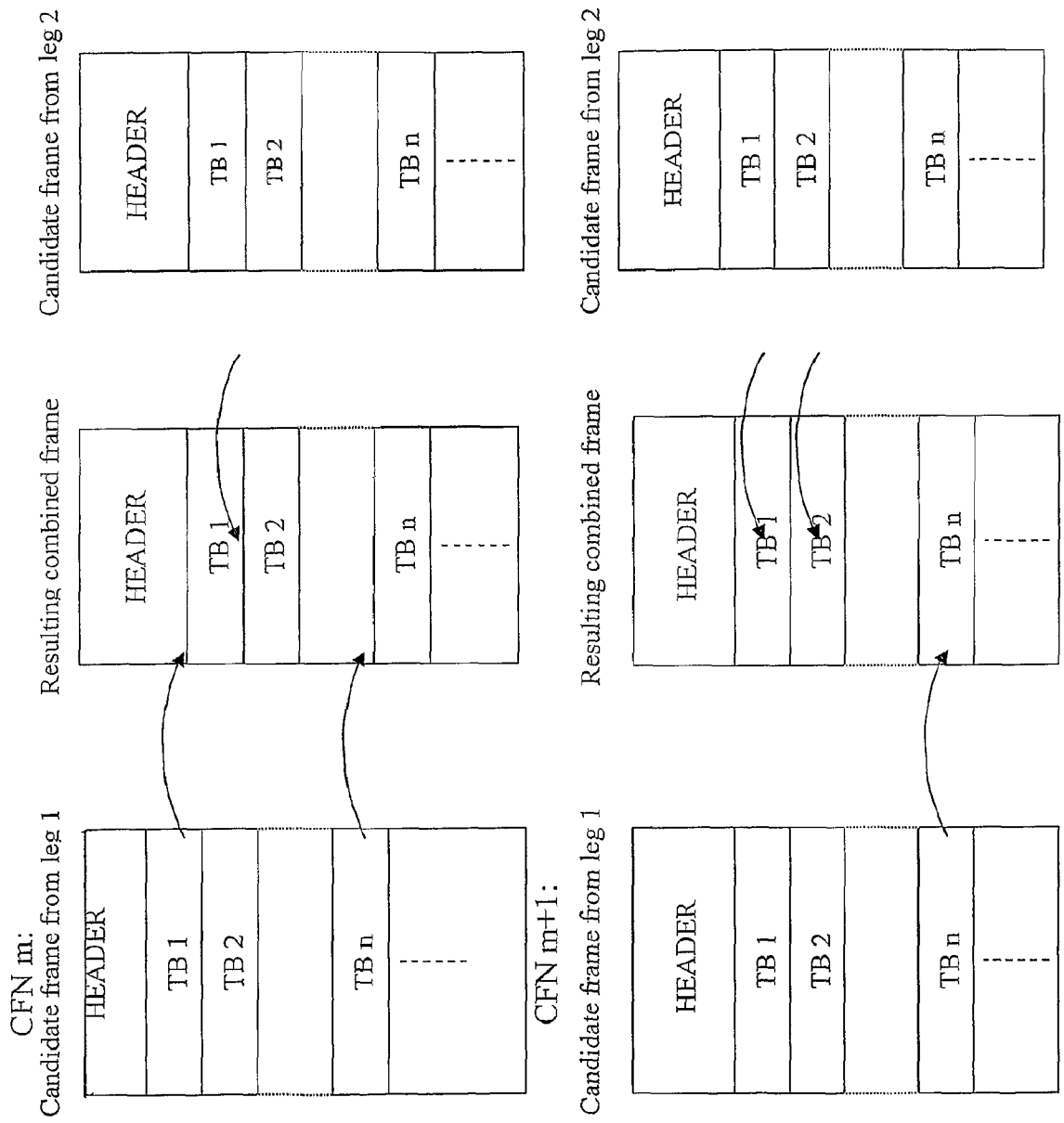
FIG. 2 illustrates schematically the combining procedure for non-voice DCHs.
Figure 3:
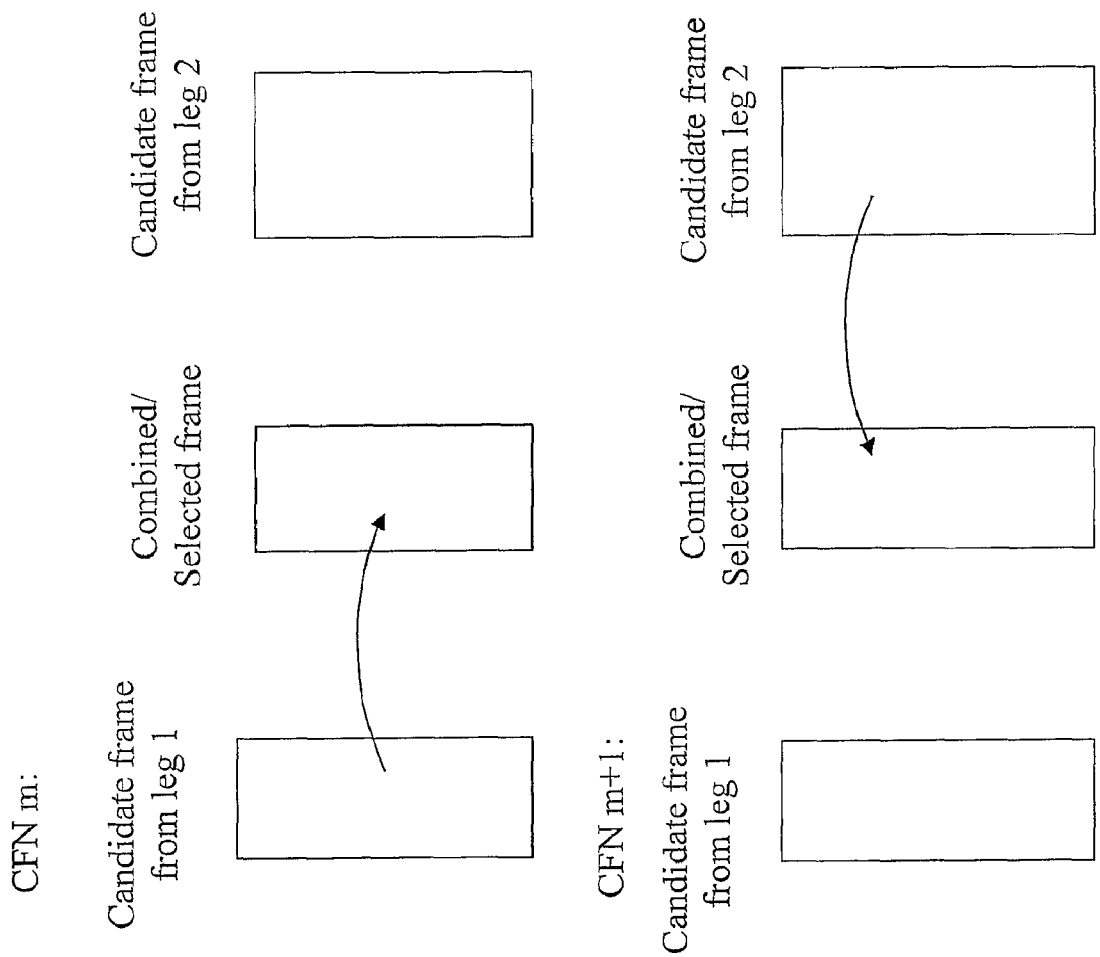
FIG. 3 illustrates schematically the combining procedure for voice DCHs.
Figures 4A, 4B:
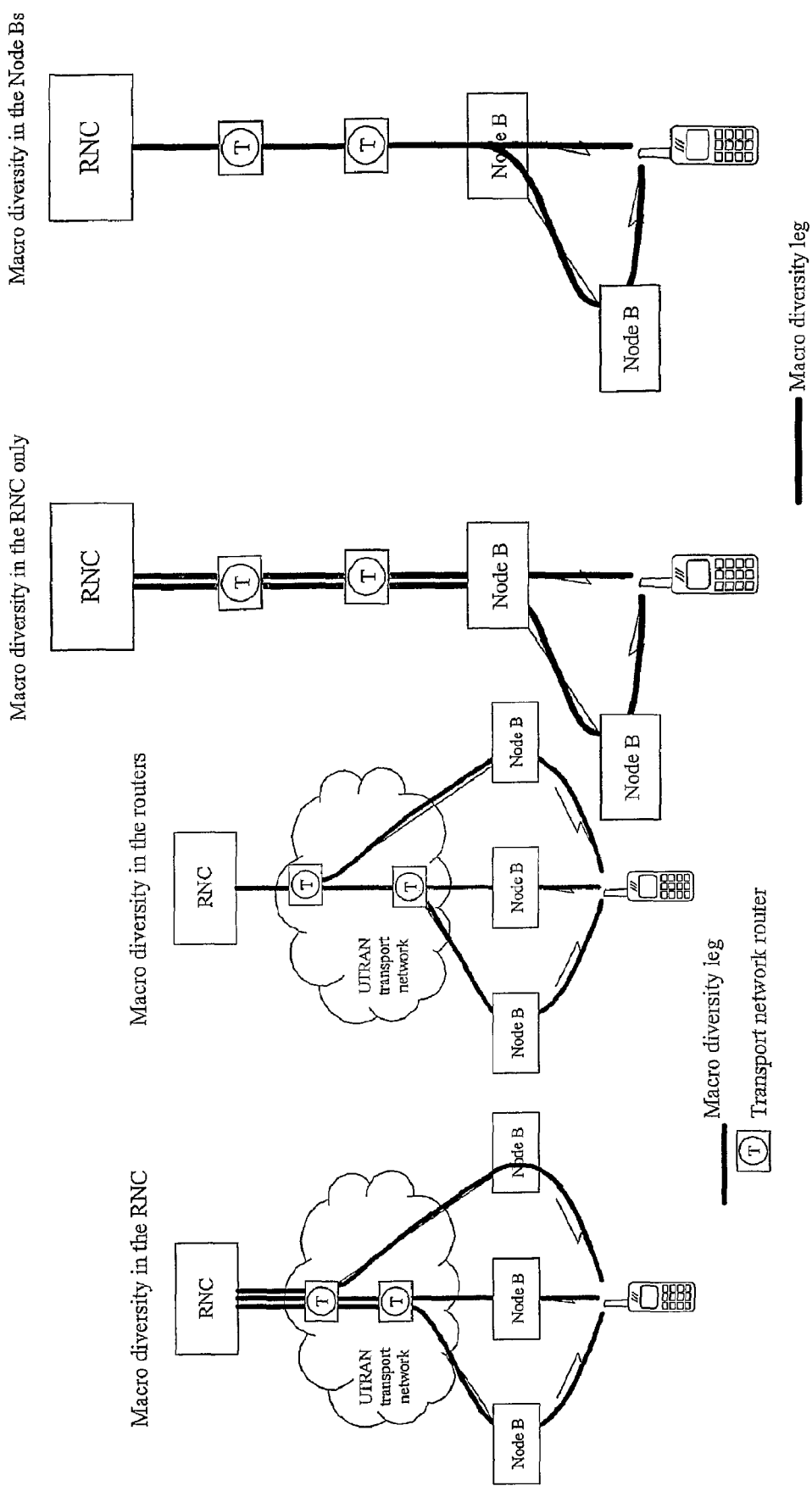
FIGS. 4a and 4b illustrates schematically potential transmission savings in a network.

Example, non-limiting embodiments now described. This invention may, however, be embodied in many different forms and should not be construed as limited to the embodiments set forth herein. In the drawings, like numbers refer to like elements.

In the description, coordinated DCHs are not specifically treated. A set of coordinated DCHs is treated in the same way as a single separate DCH. The DCHs of a set of coordinated DCHs use a common transport bearer and in an IP UTRAN the frames (of a set of coordinated DCHs) with the same CFN are included in the same UDP packet. The special combining procedure for coordinated DCHs has been described above. Thus, omitting coordinated DCHs serves to simplify the description and makes the text more readable, but a person skilled in the art understands coordinated DCHs are encompassed by the technology described.

The technology may be implemented in a UTRAN having an Internet Protocol (IP)-based transport network as illustrated in FIG. 1. The IP based transport network may be controlled by an IP of version 4, 6 or future versions. The technology may also be implemented in a UTRAN having an Asynchronous Transfer Mode (ATM) based transport network.

In order to reduce the required transmission resources, the macro diversity functionality is distributed from the RNC to another node in the UTRAN closer to the mobile terminal. The node is referred to as a DHO enabled node and may be a node in the UTRAN transport network such as a router or a Node B or even a future type of node, e.g. a specialized DHO node. Thus the splitting and combining of the traffics flows may be performed in a router in the transport network or in a Node B. The macro diversity functionality may also be distributed to more than one such other node such that several splitting and combining nodes are interconnected in a way that a hierarchical tree of macro diversity data flows is formed.

However, when the macro diversity functionality, also referred to as DHO functionality, is distributed to other nodes than the RNCs, possibly in a hierarchical fashion, a problem arises in conjunction with the timing of the uplink combining procedure.

In the further description a DHO enabled node that is actually executing the DHO functionality is denoted a DHO node. The DHO node that is responsible for a radio link towards the mobile terminal may more specifically be denoted radio active DHO node. Likewise, the DHO node that is not responsible for a radio link towards the mobile terminal e.g. a router in the UTRAN transport network or a Node B without a radio link to the mobile terminal may more specifically be denoted non-radio active DHO node.

In current UTRANs the RNC has a receive window for uplink DCH FP frames with the same Connection Frame Number (CFN) from different macro diversity legs of the same DCH. At the end of the receive window the received frames are combined. The receive window may be adjusted, i.e. moved (and theoretically even extended or shrunk) based on the actual arrival times of the uplink frames, in order to adapt to the transport delay through the UTRAN transport network. The RNC may also simply set the time of arrival window in a non-adaptive fashion based on the maximum delay that a frame (under normal circumstances) experiences when transported through the UTRAN transport network. The UTRAN transport network is then dimensioned such that the transport delay for a DCH FP frame under normal circumstances very seldom exceeds a maximum allowed value.

When the DHO functionality is distributed to other UTRAN nodes, the situation is different. The distributed DHO nodes introduce longer data paths and, in case of hierarchical DHO nodes, additional combining delays. In order to efficiently utilise the distributed, hierarchical DHO functionality the additional combining delay should be minimised. In addition, in the general case the hierarchical DHO node scheme enables numerous potential combinations of DHO nodes, resulting in many different possible transport delays between a leaf Node B and a DHO node. Thus, a simple "always-assume-maximum-delay" strategy is not acceptable. To be able to economise with the combining delay and to be able to deal with unpredictable delays, an adaptive uplink receive window for each DCH has to be used in the distributed DHO nodes according to the present invention. Furthermore, if a DHO node lacks a suitable internal time reference for the receive window, this is yet a motivation for making the receive window adaptive.

One object of the uplink combining timing algorithm according to the present invention is to minimise the additional delay caused by waiting for lost or abnormally delayed frames, while ensuring that normally delayed frames are seldom lost (i.e. excluded from the combining procedure). In essence, the object of the timing algorithm is to achieve a reasonable trade-off between combining delay and frame loss. Therefore the timing algorithm according to the present invention is arranged to adapt the end of the receive window to the greatest reasonable delay for a certain delay class (if delay classes are used). The timing algorithm uses the actual arrival times of the uplink frames as input data together with parameters that are either preconfigured, explicitly signalled from the RNC or derived from data signalled from the RNC, e.g. the Transmission Time Interval (TTI) and DCH characteristics.

Explicitly signalled timing algorithm parameters are conveyed from the RNC to the DHO node in conjunction with the establishment or modification of the macro diversity tree. The protocol to use to convey the parameters from the RNC to the DHO node may be NBAP, RNSAP or some other type of protocol for conveying parameters from the RNC to a node acting as a DHO node.

The timing algorithm may be executed in either of two modes: single-leg mode or all-leg mode. In the single-leg mode a DHO node executes one independent timing algorithm instance for each uplink macro diversity leg (for each DCH) that the DHO node combines (except the one that arrives across the radio interface of the DHO node itself. For each CFN for which uplink frames are expected (i.e. for each TTI) the timing algorithm calculates a receive window for each macro diversity leg. It should be noted that the receive window is denoted "receive window" or "leg receive window" for the single leg mode while the receive window is only denoted "receive window" for the all-leg mode. Hence, the term receive window may be referring to both the single-leg mode and the all-leg mode.

A Node B transmits data once every TTI. The size of the TTI may vary for different DCHs, whereas the CFN is always incremented at a constant rate (with a period of 10 ms) that is higher than that of the smallest possible TTI. Thus, depending on the size of the TTI the difference between the CFNs of two consecutive DCH FP data frames may be different for different DCHs. For simplicity this circumstance is disregarded during the further description.

A receive window for a single macro diversity may as described above henceforth be denoted "leg receive window". For each frame combining (i.e. for each CFN), the timing algorithm instance that indicates the latest combining time (i.e. the latest leg receive window end) governs the latest allowed time of combining.

Figure 9:
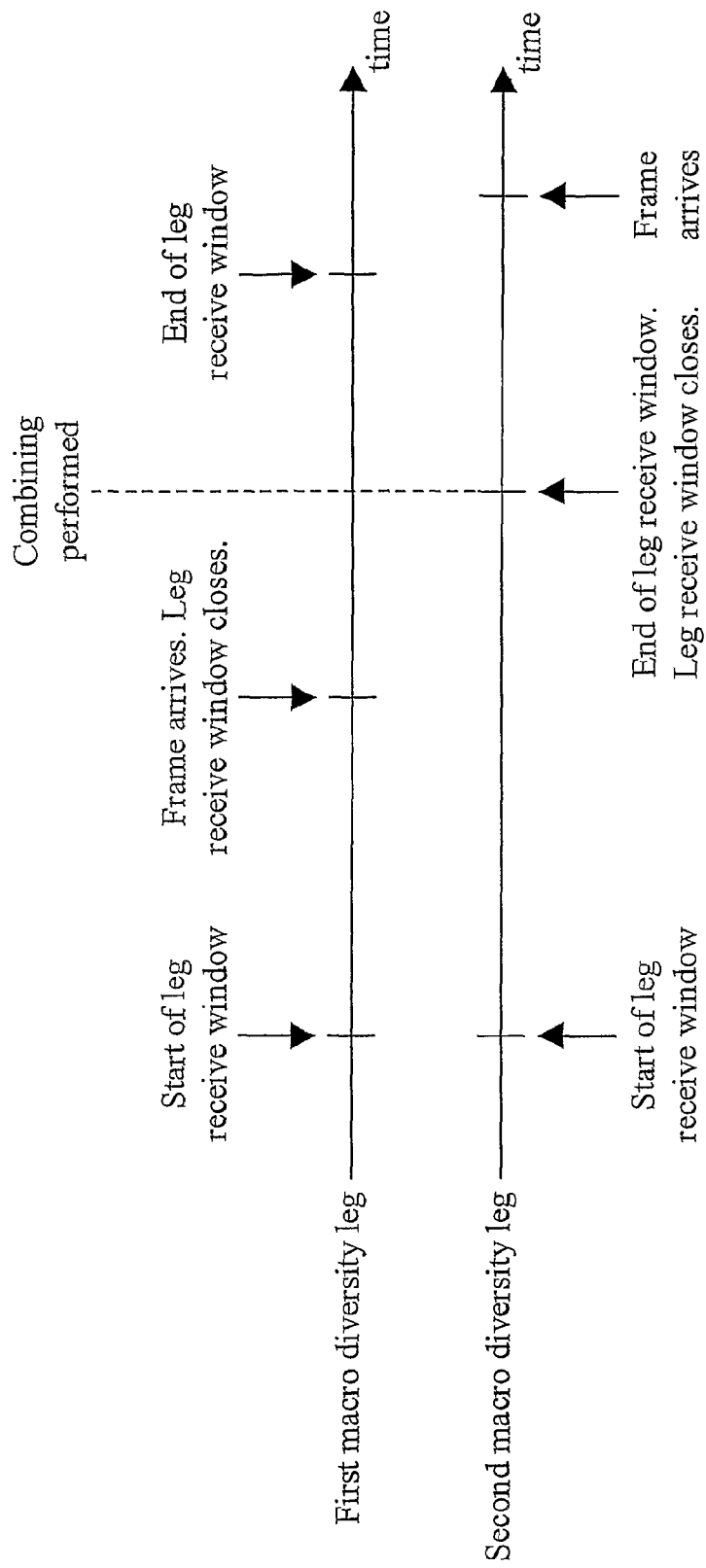
FIG. 9 illustrates the basic operation of a combining timing algorithm in the single-leg mode.

A leg receive window is "closed" when its end is reached or when the expected frame arrives, whichever happens first. A DHO node keeps waiting for frames to be combined as long as at least one of the leg receive windows associated with the DCH macro diversity legs to be combined is "open". Assume, for instance, that a DHO node combines two macro diversity legs in addition to the macro diversity leg across its own radio interface for a certain DCH. The leg receive window for the first leg has the latest endpoint, but its frame happens to arrive before the frame of the second leg. The leg receive window of the first leg is then closed and the DHO node will wait no longer than until the end of the leg receive window of the second leg (or until the frame of the second leg arrives) before it combines the received frames and sends off the result. This means that even if the frame of the second leg does not arrive, the DHO node may stop waiting before the end of the leg receive window of the first leg (which had the latest endpoint), which was initially seen as the latest allowed time of combining. This example of the basic operation of a timing algorithm in the single-leg mode is illustrated in FIG. 9.

Figure 10:
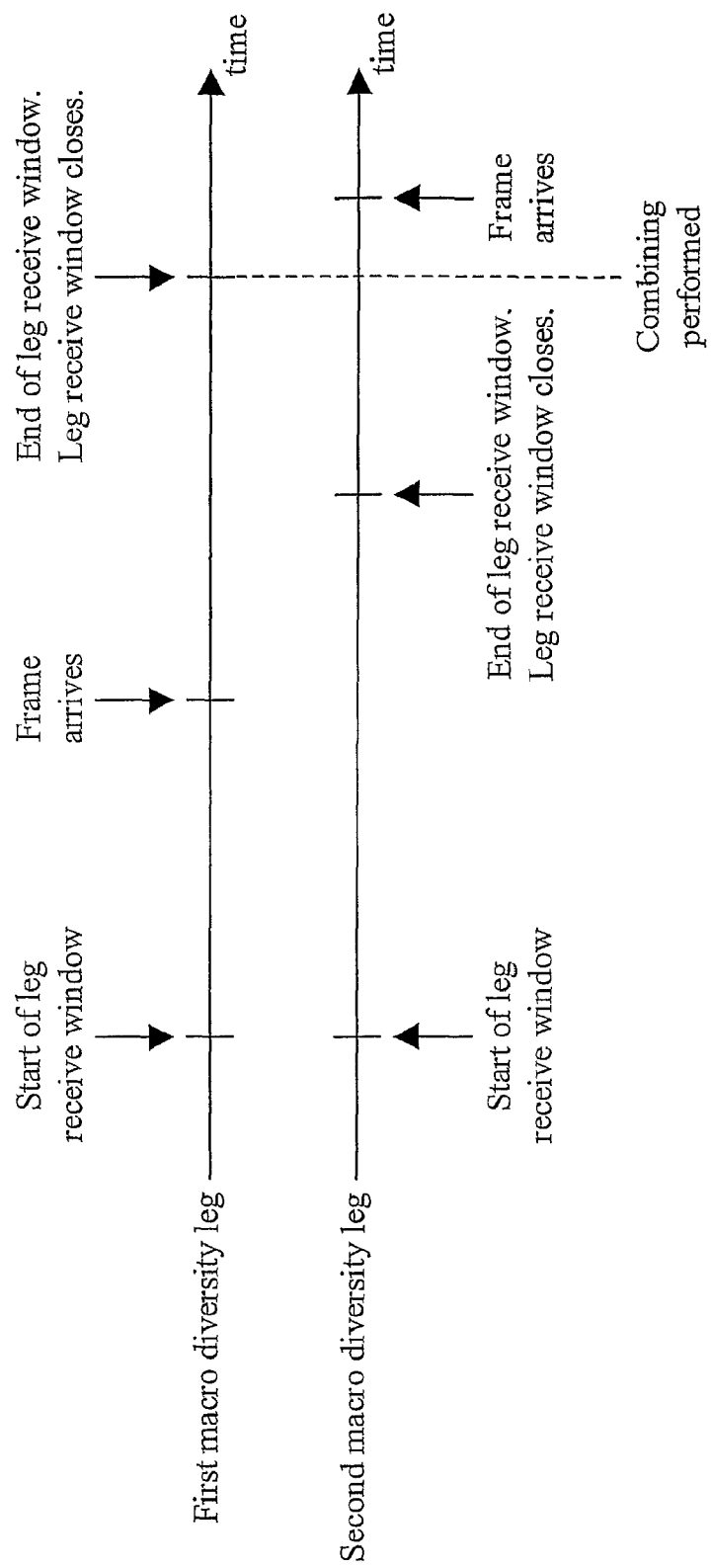
FIG. 10 illustrates the basic operation of a combining timing algorithm using a variation of the single-leg mode.

A variation of the single-leg mode, which could be seen as something in between the above described single-leg mode and the all-leg mode, is to let a leg receive window remain "open" until its endpoint, even if its expected frame has arrived (unless the frame was the last of the frames to be combined in which case the frames are combined immediately upon the arrival of the last frame). With this principle the above example with two macro diversity legs in addition to the macro diversity leg across the radio interface of the DHO node becomes different. Since the leg receive window of the first leg is not closed when its frame arrives, the DHO node may wait for the frame of the second leg as long as until the end of the leg receive window of the first leg (which had the latest endpoint) before combining the received frames (unless the frame of the second leg arrives earlier than the end of the leg receive window of the first leg). Thus, in this variation of the single-leg mode the end of the leg receive window of the first leg (i.e. the latest of the endpoints of the leg receive windows of the macro diversity legs to be combined) remains the latest allowed time of combining irrespective of when the different frames arrive. This example of the basic operation of a timing algorithm using this variation of the single-leg mode is illustrated in FIG. 10.

In the all-leg mode, a DHO node executes a single timing algorithm instance for all uplink macro diversity legs (for each DCH) that the DHO node combines (excluding the one that arrives across the radio interface of the DHO node itself. The timing algorithm calculates a receive window for each CFN, but no separate leg receive windows.

In both modes, if the DHO node has received an uplink frame from each macro diversity leg to be combined before the latest allowed time of combining, it should not waste time waiting until the end of a receive window. Instead, it immediately combines the received frames and sends off the result. The opposite strategy, i.e. always waiting until the latest allowed time of combining (according to the timing algorithm), would also work, although less efficiently, and may have the advantage that it is simpler to implement.

Furthermore, if the DHO node is a radio active DHO node that has two (or more) softer handover legs for the concerned DCH, the DHO node should always wait for the completion of the softer handover combining before performing the combining of the other macro diversity leg(s), even if the softer handover combining is not completed until after the last allowed time of combining according to the timing algorithm. In essence this means that the actual latest allowed time of combining is set by the latest of the time indicated by the timing algorithm and the time of completion of the softer handover combining.

Frames that arrive too late for the combining procedure may be either discarded or forwarded uncombined. Discarding is the simplest principle, but if forwarding is used, the frame may eventually be included in a combining procedure in the RNC. If the forwarding option is used, DHO nodes should always be prepared to recalculate the timing algorithm calculations in accordance with a later arriving unexpected frame.

In a radio active Node B acting as a DHO node the expected time of arrival of uplink data across the radio interface forms a natural reference that marks the start of the receive window or leg receive window for a certain CFN. For such radio active DHO nodes the RNC may provide an initial estimate for the end of the receive window or the end of each leg receive window, based on the delay information in a topology database or possibly other information sources. In a non-radio active DHO node e.g. a non-radio active Node B or a router there is no such reference. Instead a non-radio active DHO node may use the end of the previous receive window or leg receive window (or the time of combining for the previous CFN) as the start of the current receive window or leg receive window. A consequence of the lack of time reference is that the combining non-radio active node is not able to easily define a time of arrival window for the frames to be combined. The trigger point may be the first of the candidate frames that arrive. The non-radio active node is then required to wait for the remaining candidate frame(s) to arrive from the other leg(s). When the combining is performed in the RNC as in the prior art, the RNC waits until the end of the TTI, but the non-radio active node does not have any such reference timing. Thus the timing algorithm may differ between radio active DHO nodes and non-radio active DHO nodes.

The timing algorithm must also be able to handle the case when frames do not arrive at all (e.g. because of frame loss or discontinuous transmission, DTX). There are two solutions to the problem that a DHO node cannot determine in advance whether a frame will not arrive at all or is just being unexpectedly or abnormally delayed. The first solution is that the DHO node after combining the available frames for CFN=n assumes that any yet outstanding frames will not arrive and performs the timing algorithm calculations accordingly. In such case the DHO node must be prepared to recalculate the timing algorithm calculations in case an outstanding frame subsequently arrives. Thus, the DHO node must keep the timing algorithm parameters associated with CFN=n until the start of the next receive window or leg receive window or until a frame with a CFN>n arrives. The second solution is that the DHO node waits a sufficiently long time, e.g. TTI/2 or until, or almost until, the expected start of the next receive window or leg receive window if such a time reference is available before it performs the timing algorithm calculations associated with CFN=n.

An RNC (i.e. an SRNC or a combining DRNC) may use the same timing principle (and algorithm if any) as in today's UTRANs without distributed DHO functionality, but it may also use any timing algorithm described in the example embodiments. If an RNC uses a timing algorithm that requires a time reference, it can estimate a reasonable time reference based on the synchronization between the RNC and the Node Bs which is acquired e.g. by using a Node Synchronisation procedure.

Hence, one way to overcome the above stated problem is to let the DHO node define an adaptive latest accepted time of arrival (LAToA) for a next DCH frame or a next set of frames to be combined, i.e. the expected frame or frames with a certain Connection Frame Number (CFN). The object is to adapt the LAToA to the maximum transport delay that the frame or frames is/are allowed to experience on its/their path(s) from the originating Node B(s) to the DHO node, assuming that this transport delay very seldom exceeds the maximum allowed transport delay as stipulated by standard requirements.

In general, the DHO node uses one of the timing algorithms further described below to estimate the LAToA for the next frame (in the single-leg mode) or set of frames (in the all-leg mode) to be combined, i.e. a set of frames with a certain CFN, based on the times of arrival of the previous set of frames, i.e. the frames with the previous CFN. The estimates are adjusted for each new CFN.

A number of uplink combining timing algorithms according to embodiments of the present invention are described in the following. Some of them are designed specifically for radio active DHO nodes, while others can be used by both radio active and non-radio active DHO nodes.

Timing Algorithms for Radio Active DHO Nodes

The uplink combining timing algorithms in this section are designed for radio active DHO nodes.

Timing Algorithm 1

Timing algorithm 1 calculates the LAToA for a next frame or (in the single-leg mode) or set of frames (in the all-leg mode) to be combined and is first elaborated for the single-leg mode. Then the differences between the all-leg mode and the single-leg mode are described.

The timing algorithm adapts to the actual arrival times of the uplink frames in order to set a reasonable end of the leg receive window. It allows a safety margin for each frame in addition to the latest expected time of arrival.

When a frame arrives later than expected, this is interpreted as an indication of that the end of the leg receive window should be moved later in time for the next frame. However, since there are occasional abnormally delayed frames and since the path delay may vary in time, the algorithm slowly moves the end of the leg receive window earlier in time when frames arrive before the latest expected time of arrival.

If a single abnormally delayed frame causes the end of the leg receive window to be moved far, it may take a significant number of CFNs before the slow advancing mechanism has brought the end of the leg receive window back to reasonable values. In the meantime, the DHO node will wait too long for lost or abnormally delayed frames. The consequence of waiting too long is that the uplink frames that the DHO node sends may eventually arrive too late at the RNC and consequently be lost. To reduce this risk the desired behaviour of the algorithm is to be somewhat conservative in moving the end of the leg receive window further away in large steps and to quickly bring back the end of the leg receive window to reasonable values, until the late arrival time is confirmed by several frames.

This behaviour is achieved by making the leg receive window end advancing mechanism adaptive in itself. A sudden large increase in the delay causes the advancing mechanism to speed up. During periods without large delay increases the advancing mechanism gradually slows down to a minimum value.

Figure 5:
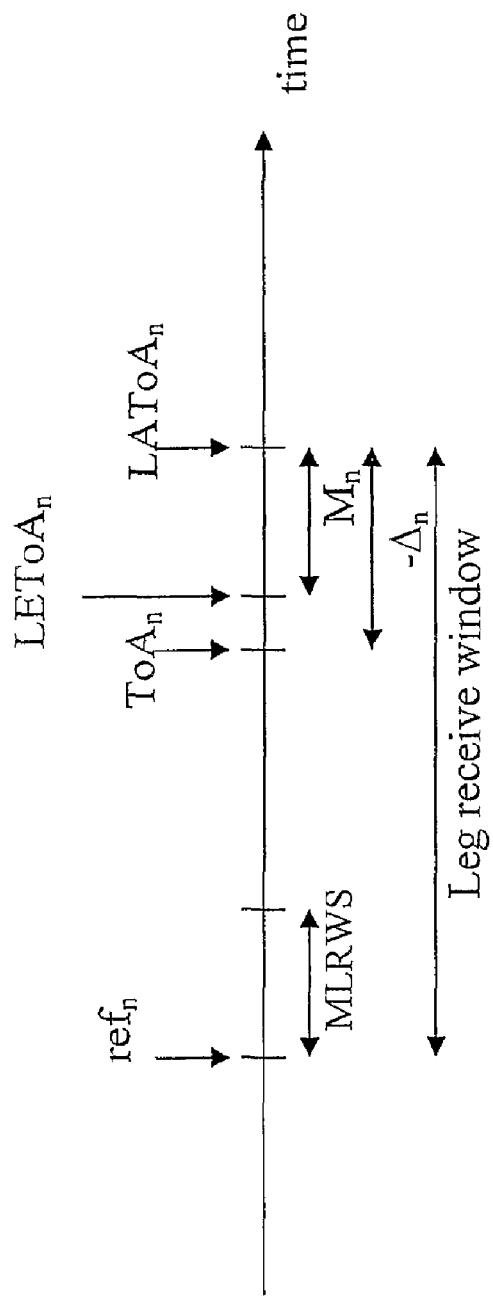
FIG. 5 is a schematic reference figure for the timing algorithm 1.

FIG. 5 illustrates the timing algorithm 1. FIG. 5 illustrates most of the parameters that are used in the timing algorithm for a general uplink frame with CFN=n. The LAToA and M parameters have to have their initial values defined, i.e. $LAToA_{init}$ and $M_{init}$. The M parameter is the time distance between the latest expected ToA of a DCH frame n or set of DCH frames n and the end point of the adaptive receive window for DCH frame n or set of DCH frames n.

A value to be used to set $LAToA_{init}$ may be signalled from the RNC e.g. together with the other DHO related instructions. What actually may be signalled is a relative time limit i.e. the initial Latest Acceptable Relative Time of Arrival, $LARToA_{init}$. Thus, $LAToA_{init}=ref_{init}+LARToA_{init}$. The RNC may base the $LARToA_{init}$ value on delay data in the route tree retrieved from a topology database or possibly other information sources.

In accordance with an example embodiment, the $LAToA_{init}$ is not signalled from the RNC, but it is set to a preconfigured default value. This default value may be different or one and the same for different QoS classes. E.g. one for each delay class if delay classes are used. It may also be derived from the DCH characteristics (e.g. those signalled from the RNC when the DCH is established). In any case the default $LAToA_{init}$ value should be conservatively set such that the initial receive window is only a rather small fraction (e.g. 10%) of the maximum allowed total transport delay in the UTRAN for the concerned delay class if applicable.

In the general case the M parameter is defined as the sum of two parts: a fixed part ($M_{fix}$), which is the same for all CFNs, and a dynamic part ($M_{dynamic}$), which varies for each CFN. There are several alternative ways of calculating $M_{dynamic}$. If possible, the value of $M_{init}$ is calculated by inserting the initial values of the input parameters in the general formula for M. If this is not possible, because some of the parameters in the general M formula have no defined initial values, then $M_{init}=M_{fix}$. $M_{fix}$ may be signalled from the RNC (in the Combining timing info IE) or derived from the DCH characteristics. It may also be a preconfigured value, possibly per delay class. $M_{fix}$ should typically have a value between 0 and around 10% of the maximum allowed UTRAN transport network delay.

The value of the Minimum Leg Receive Window Size (MLRWS) parameter, i.e. the allowed minimum size of the receive window, may be signalled from the RNC e.g. together with other DHO related instructions. If it is not signalled from the RNC it may be either preconfigured or derived from the DCH characteristics (e.g. QoS class).

In addition to the parameters illustrated in FIG. 5, some parameters are needed for the receive window end advancing mechanism, also referred to as the leg receive window end advancing step when associated with the single-leg mode:

$\delta_n$ The receive window end advancing step for CFN=n. The purpose of the $\delta$, is to advance the receive window end relative the time reference, as long as the received frames do not require the opposite. The object is to counteract influence from frames arriving later than they should according to their QoS class. Thus, the receive window end advancing step parameter is adapted to slowly reduce the size of the receive window when the frame or set of frames arrives/arrive before the end of the receive window.

$\delta_{min}$ The minimum leg receive window end advancing step.

$\delta_{min1/2}$ Half of the minimum leg receive window end advancing step.

$\delta_{init}$ The initial value of $\delta$. $\delta_{init}=\delta_{min}$.

f A parameter that is used in the calculation of $\delta_{n+1}$, when the uplink frame arrived too late for CFN=n, as in case 3 defined below.

The initial value of $\delta$ should be set to $\delta_{min}$, i.e. $\delta_{init}=\delta_{min}$. The f parameter should have a value between 0 and 1, and may be pre-configured. A preferred value is f=0.25.

A summary of the parameters of the timing algorithm 1 is shown below, but it should be noted that the same parameters are used in other timing algorithms described below:

$ref_n$ The time reference (e.g. the expected time of arrival of uplink data across the radio interface) for CFN=n. $ref_{n+1}=ref_n+TTI$.

$ref_{init}$ The time reference for the first uplink frame to be combined in the concerned macro diversity leg.

$ToA_n$ Time of Arrival of the frame with CFN=n.

$LAToA_n$ Latest Acceptable time of Arrival for the frame with CFN=n. This is the end of the leg receive window. Frames with CFN≦n arriving after $LAToA_n$ are not combined.

$LAToA_{init}$ The initial value of LAToA. This parameter value may be preconfigured (possibly per delay class) or derived from the DCH characteristics. It may also be signalled from the RNC in the form of $LARToA_{init}$ with $LAToA_{init}=ref_{init}+LARToA_{init}$.

$LEToA_n$ Latest Expected Time of Arrival for the frame with CFN=n. $LEToA_n=LAToA_n-M_n$.

MLRWS Minimum Leg Receive Window Size. This parameter indicates the minimum size of a leg receive window. It may be preconfigured, derived from DCH specific data (e.g. QoS class) or signalled from the RNC. MLRWS≧0.

$M_n$ The safety margin for the frame with CFN=n. The general formula for calculation of $M_n$ is $M_n=M_{fix}+M_{dynamic-n}$.

$M_{fix}$ The fixed part in the general formula for calculation of $M_n$. $M_{fix}$ may be preconfigured, derived from DCH specific data or signalled from the RNC. $M_{fix}$ typically has a value (possibly per delay class) between 0 and around 10% of the maximum allowed UTRAN transport network delay.

$M_{dynamic-n}$ The dynamic part in the general formula for calculation of $M_n$.

α A parameter used in the calculation of $M_{dynamic-n}$. α has a fixed configured value $0 \leq \alpha \ll 1$.

$M_{init}$ The initial value of M. If $M_{dynamic-init}$ is defined, $M_{init}=M_{fix}+M_{dynamic-init}$. Otherwise $M_{init}=M_{fix}$.

$\Delta_n$ The difference between the actual time of arrival and the latest acceptable time of arrival for the frame with CFN=n. $\Delta_n=\text{ToA}_n-\text{LAToA}_n$.

TTI Transmission Time Interval. The received frames arrives at an interval of one TTI. The parameter is a part of the basic DCH characteristics.

For each uplink frame the parameters $\text{LAToA}_n$, $M_n$ and $\delta_n$ have to be calculated. For the first frame to be combined the initial parameter values are used. For any subsequent frame the algorithm considers four different cases:

Case 1: $\text{ToA}_n \leq \text{LATiA}_n - M_n$

Case 2: $\text{LAToA}_n - M_n < \text{ToA}_n \leq \text{LAToA}_n$

Case 3: $\text{ToA}_n > \text{LAToA}_n$

Case 4: The frame does not arrive at all, i.e. $\text{ToA}_n$ is undefined.

The calculations performed for the different cases are described below.

Case 1, $\text{ToA}_n \leq \text{LAToA}_n - M_n$:

$$\delta_{n+1}=\delta_n/2+\delta_{min1/2}$$

$$\text{LAToA}_{n+1}=\text{MAX}(\text{LAToA}_n+\text{TTI}-\delta_{n+1}, \text{ref}_{n+1}+\text{MLRWS})$$

There are different ways of calculating $M_{n+1}$:

$M_{n+1}$ Calculation Method I (the Preferred Method):

$$M_{n+1}=M_{fix}+\alpha(\text{LAToA}_{n+1}-\text{ref}_{n+1})=M_{fix}+\alpha(\text{LAToA}_n+\text{TTI}-\delta_{n+1}-\text{ref}_{n+1})$$

The method I, adjusts $M_{n+1}$ to the size of the leg receive window n+1.

$M_{n+1}$ Calculation Method II:

$$M_{n+1}=M_{fix}+\alpha(\text{LAToA}_n-\text{ref}_n)$$

The method II adjusts $M_{n+1}$ to the size of the leg receive window n. That results in a poorer adjustment but the method II is less complex than method I.

$M_{n+1}$ Calculation Method III:

$$M_{n+1}=M_{fix}+\alpha(\text{ToA}_n-\text{ref}_n)$$

The method III uses another principal than the methods I and II. It adjusts $M_{n+1}$ to the difference between the time of arrival for frame n and the time reference of frame n.

$M_{n+1}$ Calculation Method IV:

$$M_{n+1}=M_{fix} \text{ (i.e. } \alpha=0\text{)}$$

Case 2, $\text{LAToA}_n - M_n < \text{ToA}_n \leq \text{LAToA}_n$:

$$\delta_{n+1}=\delta_n/2+\delta_{min1/2}$$

There are different ways of calculating $M_{n+1}$:

$M_{n+1}$ Calculation Method I (the Preferred but also the Most Complex):

$$M_{n+1} = M_{fix} + \alpha(\text{LAToA}_{n+1} - \text{ref}_{n+1})$$

$$= \{\text{see below for } \text{LAToA}_{n+1}\} =$$

$$= M_{fix} + \alpha\left(\text{MAX}\begin{pmatrix}\text{ToA}_n + \text{TTI} + M_{n+1} - \delta_{n+1},\\ \text{ref}_{n+1} + \text{MLRWS}\end{pmatrix} - \text{ref}_{n+1}\right) \Rightarrow$$

$$\{\text{ref}_{n+1} - \text{TTI} = \text{ref}_n\} \Rightarrow M_{n+1} =$$

$$= \text{MAX}\left(\frac{1}{1-\alpha} \times M_{fix} + \frac{\alpha}{1-\alpha} \times (\text{ToA}_n - \delta_{n+1} - \text{ref}_n), M_{fix} + \alpha \times \text{MLRWS}\right) \text{ where}$$

$$\frac{1}{1-\alpha} \times M_{fix} \text{ and } \frac{\alpha}{1-\alpha}$$

are constants that can be preconfigured or calculated once and for all in advance.

$M_{n+1}$ Calculation Method II, III and IV are the Same as in Case 1.

The last step is to calculate $\text{LAToA}_{n+1}$:

$$\text{LAToA}_{n+1}=\text{MAX}(\text{ToA}_n+\text{TTI}+M_{n+1}\delta_{n+1}, \text{ref}_{n+1}+\text{MLRWS})$$

Case 3, $\text{ToA}_n > \text{LAToA}_n$:

$$\delta_{n+1}=\delta_n/2+\delta_{min1/2}+f \times \Delta_n$$

$M_{n+1}$ is calculated in the same way as in case 2.

$$\text{LAToA}_{n+1}+=\text{MAX}(\text{ToA}_n+\text{TTI}+M_{n+1}-\delta_{n+1}, \text{ref}_{n+1}+\text{MLRWS})$$

Case 4, the Frame does not Arrive at all:

In this case $\text{ToA}_n$ is undefined. Set $\text{ToA}_n = \text{ref}_n$ and choose to perform the calculations of case 1, case 2 or case 3 according to the normal criteria (which normally would result in that the calculations of case 1 are performed).

How does the DHO node determine that the frame will not arrive at all? What if the DHO node determines that the frame will not arrive and performs the calculations of case 4 and then the frame arrives after all? There are two solutions to this problem. The first one is that after $\text{LAToA}_n$ the DHO node performs the calculations of case 4, but if the absent frame subsequently arrives (before $\text{ref}_{n+1}$), the DHO node must be able to recalculate according to the calculations of case 3. Thus, the DHO node must keep the parameters associated with CFN=n until $\text{ref}_{n+1}$ occurs. The second solution is that the DHO node waits a sufficiently long time, e.g. until $\text{ref}_{n+1}$ (or almost until $\text{ref}_{n+1}$), before it performs the calculations associated with CFN=n.

The following is a compact way of expressing timing algorithm 1 in the single-leg mode (using $M_{n+1}$ calculation method I in all cases):

```
IF (frame with CFN = n does not arrive) THEN ToA_n = ref_n;
Δ_n = ToA_n - LAToA_n;
IF Δ_n > 0 THEN δ_{n+1} = δ_n/2 + δ_{min1/2} + f × Δ_n ELSE δ_{n+1} = δ_n/2 + δ_{min1/2};
IF Δ_n > -M_n THEN
{
M_{n+1} =

= MAX( 1/(1-α) × (M_fix + α × (ToA_n - δ_{n+1} - ref_n)), M_fix + α × MLRWS);

LAToA_{n+1} = MAX(ToA_n + TTI + M_{n+1} - δ_{n+1}, ref_{n+1} + MLRWS);
}
ELSE
{
LAToA_{n+1} = MAX(LAToA_n + TTI - δ_{n+1}, ref_{n+1} + MLRWS);
M_{n+1} = M_fix + α(LAToA_{n+1} - ref_{n+1});
};
```

Figure 6:
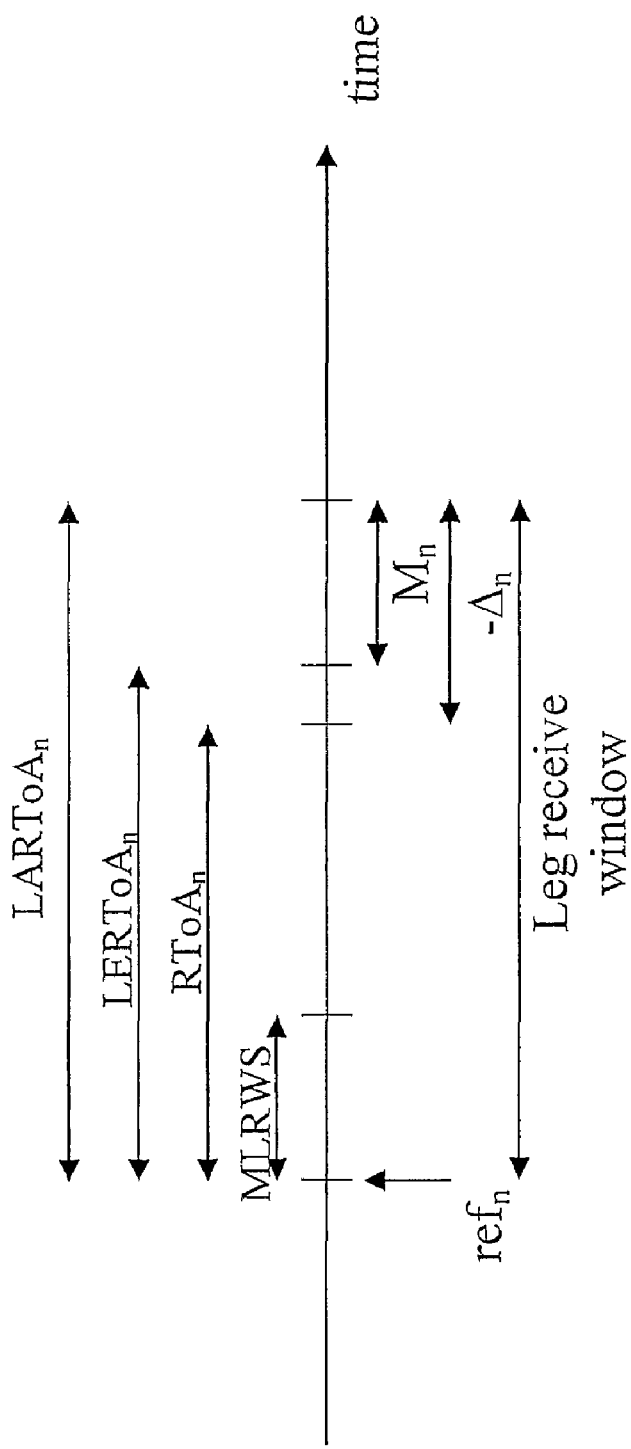
FIG. 6 is a schematic reference figure for algorithm 1 when relative times are used according to an embodiment.

This timing algorithm 1 may also be expressed in times relative to the time reference ref instead of absolute times. The resulting reference figure is shown in FIG. 6.

When relative times are used, if the initial Latest Acceptable Relative Time of Arrival (LARToA$_{init}$) parameter is signalled from the RNC, it may be used as it is as a time reference for the first frame to be combined.

The timing algorithm 1 with relative times determines the LARToA$_{n+1}$ accordingly. The rest of timing algorithm 1 with relative times follows below:

Case 1, RToA$_n \leq$ LARToA$_n$−M$_n$:

$$\delta_{n+1} = \delta_n/2 + \delta_{min1/2}$$

$$LARToA_{n+1} = MAX(LARToA_n - \delta_{n+1}, MLRWS)$$

There are different ways of calculating M$_{n+1}$:

M$_{n+1}$ Calculation Method I (the Preferred Method):

$$M_{n+1} = M_{fix} + \alpha \times LARToA_{n+1} = = M_{fix} + \alpha(LARToA_n - \delta_{n+1})$$

M$_{n+1}$ Calculation Method II:

$$M_{n+1} = M_{fix} + \alpha \times LARToA_n$$

M$_{n+1}$ Calculation Method III:

$$M_{n+1} = M_{fix} + \alpha \times RToA_n$$

M$_{n+1}$ Calculation Method IV.

$$M_{n+1} = M_{fix} \text{ (i.e. } \alpha = 0)$$

Case 2, LARToA$_n$−M$_n$ < RToA$_n \leq$ LARToA$_n$:

$$\delta_{n+1} = \delta_n/2 + \delta_{min1/2}$$

There are different ways of calculating M$_{n+1}$:

M$_{n+1}$ Calculation Method I (the Preferred Method):

$$M_{n+1} = M_{fix} + \alpha \times LARToA_{n+1}$$

$$= \{\text{see below for } LARToA_{n+1}\} =$$

$$= M_{fix} + \alpha \times MAX(RToA_n + M_{n+1} - \delta_{n+1}, MLRWS) \Rightarrow M_{n+1}$$

$$= MAX\left( \begin{array}{c} \frac{1}{1-\alpha} \times M_{fix} + \frac{\alpha}{1-\alpha} \times \\ (RToA_n - \delta_{n+1}), M_{fix} + \alpha \times MLRWS \end{array} \right) \text{ where}$$

$$\frac{1}{1-\alpha} \times M_{fix} \text{ and } \frac{\alpha}{1-\alpha}$$

are constants that can be preconfigured or calculated once and for all in advance.

M$_{n+1}$ Calculation Method II, III and IV are the Same as in Case 1.

The last step is to calculate LARToA$_{n+1}$:

$$LARToA_{n+1} = MAX(RToA_n + M_{n+1} - \delta_{n+1}, MLRWS)$$

Case 3, RToA$_n$ > LARToA$_n$:

$$\delta_{n+1} = \delta_n/2 + \delta_{min1/2} + f \times \Delta_n$$

M$_{n+1}$ is calculated in the same way as in case 2.

$$LARToA_{n+1} = MAX(RToA_n + M_{n+1}, MLRWS)$$

Case 4, the Frame does not Arrive at all:

In this case RToA$_n$ is undefined. Set RToA$_n$=0 and choose to perform the calculations of case 1, case 2 or case 3 according to the criterias defining each case (which normally would result in that the calculations of case 1 are performed).

The following is a compact way of expressing timing algorithm 1 in the single-leg mode when relative times are used (using M$_{n+1}$ calculation method I in all cases):

---

IF (frame with CFN = n does not arrive) THEN RToA$_n$ = 0;
$\Delta_n$ = RToA$_n$ − LARToA$_n$;
IF $\Delta_n$ > 0 THEN $\delta_{n+1} = \delta_n/2 + \delta_{min1/2} + f \times \Delta_n$ ELSE $\delta_{n+1} = \delta_n/2 + \delta_{min1/2}$;
IF $\Delta_n$ > −M$_n$ THEN
{

$$M_{n+1} = MAX\left( \frac{1}{1-\alpha} \times (M_{fix} + \alpha \times (RToA_n - \delta_{n+1})), M_{fix} + \alpha \times MLRWS \right);$$

LARToA$_{n+1}$ = MAX(RToA$_n$ + M$_{n+1}$ − $\delta_{n+1}$, MLRWS);
}
ELSE
{
LARToA$_{n+1}$ = MAX(LARToA$_n$ − $\delta_{n+1}$, MLRWS);
M$_{n+1}$ = M$_{fix}$ + $\alpha$ × LARToA$_{n+1}$;
};

---

When timing algorithm 1 is used in the all-leg mode there are only few differences from the above description. The ToA and RToA parameters are replaced by the Time of Arrival of Last Frame (ToAoLF) and Relative Time of Arrival of Last Frame (RToAoLF) parameters, which both refer to the arrival time of the last uplink frame with a certain CFN from any of the macro diversity legs to be combined (except the one across the radio link of the DHO node). In addition, the MLRWS parameter is replaced by the Minimum Receive Window Size (MRWS) parameter, which refer to the receive window for all macro diversity legs to be combined. Furthermore, in the all-leg mode the condition for case 4 becomes that none of the uplink frames arrive (including all macro diversity legs to be combined except the one across the DHO node's own radio interface).

When (and if) signalling timing algorithm parameters to a DHO node using a timing algorithm in the all-leg mode, the RNC may include the LARToA$_{init}$, the MRWS, and the M$_{fix}$ parameters (when sent to a radio active DHO node).

If signalling of the LARToA$_{init}$ parameter from the RNC is used, the RNC may or may not send a LARToA$_{init}$ parameter to a DHO node using the timing algorithm in the all-leg mode, when adding a new leg to be combined in the DHO node. The RNC may also send a new LARToA$_{init}$ parameter to a DHO node whose combining procedure is not directly affected, because the delay of one of the existing macro diversity legs is affected by changes further down in the DHO node tree. The same applies for signalling of the MRWS parameter and the M$_{fix}$ parameter. When a DHO node that is already executing the timing algorithm in all-leg mode receives a LARToA$_{init}$ parameter from the RNC to be used for CFN=k, then the DHO node chooses to use it only if it results in a later LAToA$_k$/LARToA$_k$ value than the one that is produced by the running timing algorithm.

Timing Algorithm 2

Timing algorithm 2 calculates the LAToA for a next set of frames to be combined and is first elaborated for the single-leg mode. Then the differences between the all-leg mode and the single-leg mode are described.

This timing algorithm builds on timing algorithm 1, but with an addition of a parameter Extended Latest Expected Time of Arrival (ELEToA) that makes it slightly more advanced and complex. The purpose of the ELEToA is to let sparse but reoccurring late frames reduce the speed of the leg receive window end advancing mechanism for late frames. Hence, the introduction of ELEToA results in that the end of the receive window is extended to an extended point in order to counteract the speed of the receive window end advancing mechanism in the following case 3 if the frames arriving relatively late have occurred relatively frequently.

The same notation and terminology as for timing algorithm 1 is used with the following additional parameters:

$ELEToA_n$ Extended Latest Expected Time of Arrival for the frame with CFN=n. Only frames that arrive after both ELEToA and LAToA can increase the speed of the leg receive window end advancing mechanism.

$ELEToA_{init}$ The initial value of ELEToA. $ELEToA_{init}=LAToA_{init}$.

$\epsilon$ A parameter used in the calculation of ELEToA. $\epsilon$ should be a preconfigured small value (smaller than $\delta_{min}$). A suggested value for $\epsilon$ is $\epsilon = \epsilon_{min}/\epsilon$.

$\phi$ A parameter used in the calculation of ELEToA. $\phi$ is a preconfigured parameter that can have any value, preferably such that $0 \leq \phi \leq M_{fix}$.

Almost the same cases are considered as in timing algorithm 1, but the conditions for case 2 and 3 are modified.

Case 1: $ToA_n \leq LAToA_n - M_n$

Case 2: $LAToA_n - M_n < ToA_n \leq LAToA_n$ OR $LAToA_n < ToA_n \leq ELEToA_n$

Case 3: $ToA_n > LAToA_n$ AND $ToA_n > ELEToA_n$

Case 4: The frame does not arrive at all, i.e. $ToA_n$ is undefined.

The calculations performed for the different cases are described below.

Case 1, $ToA_n \leq LAToA_n - M_n$:

$$\delta_{n+1} = \delta_n/2 + \delta_{min1/2}$$

$$LAToA_{n+1} = MAX(LAToA_n + TTI - \delta_{n+1}, ref_{n+1} + MLRWS)$$

$$ELEToA_{n+1} = MAX(ELEToA_n \delta, ToA_n + \phi) + TTI$$

There are Different Ways of Calculating $M_{n+1}$ as in the Case of Timing Algorithm 1:

$M_{n+1}$ Calculation Method I (the Preferred Method):

$$M_{n+1} = M_{fix} + \alpha(LAToA_{n+1} - ref_{n+1}) = M_{fix} + \alpha(LAToA_n + TTI - \delta_{n+1} - ref_{n+1})$$

$M_{n+1}$ Calculation Method II:

$$M_{n+1} = M_{fix} + \alpha(LAToA_n - ref_n)$$

$M_{n+1}$ Calculation Method III.

$$M_{n+1} = M_{fix} + \alpha(TOA_n - ref_n)$$

$M_{n+1}$ Calculation Method IV:

$$M_{n+1} = M_{fix} \text{ (i.e. } \alpha = 0)$$

$M_{n+1}$ Calculation Method V:

$$M_{n+1} = M_{fix} + \alpha(ELEToA_{n+1} - ref_{n+1})$$

Case 2, $LAToA_n - M_n < ToA_n \leq LAToA_n$ OR $LAToA_n < ToA_n \leq ELEToA_n$:

$$\delta_{n+1} = \delta_n/2 + \delta_{min1/2}$$

$$ELEToA_{n+1} = MAX(ELEToA_{nn} - \epsilon, ToA_n + \phi) + TTI$$

There are different ways of calculating $M_{n+1}$:

$M_{n+1}$ Calculation Method I (the Preferred Method but also the most Complex):

$$M_{n+1} = M_{fix} + \alpha(LARToA_{n+1} - ref_{n+1})$$

$$= \{\text{see below for } LARToA_{n+1}\} =$$

$$= M_{fix} + \alpha\left(MAX\binom{ToA_n + TTI + M_{n+1} -}{\delta_{n+1}, ref_{n+1} + MLRWS} - ref_{n+1}\right) \Rightarrow$$

$$\{ref_{n+1} - TTI = ref_n\} \Rightarrow M_{n+1} =$$

$$= MAX\left(\frac{1}{1-\alpha} \times M_{fix} + \frac{\alpha}{1-\alpha} \times (ToA_n - \delta_{n+1} - ref_n), M_{fix} + \alpha \times MLRWS\right) \text{ where}$$

$$\frac{1}{1-\alpha} \times M_{fix} \text{ and } \frac{\alpha}{1-\alpha}$$

are constants that can be preconfigured or calculated once and for all in advance.

$M_{n+1}$ Calculation Method II, III, IV and V are the Same as in Case 1.

The last step is to calculate $LAToA_{n+1}$:

$$LAToA_{n+1} = MAX(TOA_n + TTI + M_{n+1} - \delta_{n+1}, ref_{n+1} + MLRWS)$$

Case 3, $ToA_n > LAToA_n$ AND $ToA_n > ELEToA_n$:

$$\delta_{n+1} = \delta_n/2 + \delta_{min1/2} + f \times (ToA_n - MAX(LAToA_n, ELEToA_n))$$

$$ELEToA_{n+1} = ToA_n + \phi + TTI$$

$M_{n+1}$ is calculated in the same way as in case 2.

$$LAToA_{n+1} = MAX(ToA_n + TTI + M_{n+1} - \delta_{n+1}, ref_{n+1} + MLRWS)$$

Case 4, the Frame does not Arrive at all:

In this case $ToA_n$ is undefined. Set $ToA_n = ref_n$ and choose to perform the calculations of case 1, case 2 or case 3 according to the normal criteria (which normally would result in that the calculations of case 1 are performed).

The following is a compact way of expressing timing algorithm 2 in the single-leg mode using $M_{n+1}$ calculation method I in all cases:

---

IF (frame with CFN = n does not arrive) THEN $ToA_n = ref_n$;
IF $ToA_n > LAToA_n$ AND $ToA_n > ELEToA_n$ THEN
$\delta_{n+1} = \delta_n/2 + \delta_{min1/2} + f \times (ToA_n - MAX(LAToA_n, ELEToA_n))$
ELSE $\delta_{n+1} = \delta_n/2 + \delta_{min1/2}$;
$ELEToA_{n+1} = MAX(ELEToA_n - \epsilon, ToA_n + \phi) + TTI$;
IF $ToA_n > LAToA_n - M_n$ THEN
{
$M_{n+1} =$ $= MAX\left(\frac{1}{1-\alpha} \times (M_{fix} + \alpha \times (ToA_n - \delta_{n+1} - ref_n)), M_{fix} + \alpha \times MLRWS\right)$;

$LAToA_{n+1} = MAX(ToA_n + TTI + M_{n+1} - \delta_{n+1}, ref_{n+1} + MLRWS)$;
}
ELSE
{
$LAToA_{n+1} = MAX(LAToA_n + TTI - \delta_{n+1}, ref_{n+1} + MLRWS)$;
$M_{n+1} = M_{fix} + \alpha(LAToA_{n+1} - ref_{n+1})$;
};

This timing algorithm may also be expressed in times relative to the time reference ref instead of absolute times. The resulting algorithm description follows below (with ELERToA$_n$ denoting the Extended Latest Expected Time of Arrival for the frame with CFN=n and ELERToA$_{init}$=LARToA$_{init}$).

Case 1, RToA$_n$≦LARToA$_n$−M$_n$:

$\delta_{n+1} = \delta_n/2 + \delta_{min1/2}$ $LARToA_{n+1} = MAX(LARToA_n − \delta_{n+1}, MLRWS)$ $ELERToA_{n+1} = MAX(ELERToA_n − \delta, RToA_n + \phi)$ There are Different Ways of Calculating M$_{n+1}$:

M$_{n+1}$ Calculation Method I (the Preferred Method):

$M_{n+1} = M_{fix} + \alpha \times LARToA_{n+1} == M_{fix} + \alpha(LARToA_n − \delta_{n+1})$ M$_{n+1}$ Calculation Method II.

$M_{n+1} = M_{fix} + \alpha \times LARToA_n$

M$_{n+1}$ Calculation Method III.

$M_{n+1} = M_{fix} + \alpha \times RToA_n$

M$_{n+1}$ Calculation method IV:

$M_{n+1} = M_{fix}$ (i.e. $\alpha = 0$)

M$_{n+1}$ Calculation Method V.

$M_{n+1} = M_{fix} + \alpha \times ELERToA_{n+1}$

Case 2, LARToA$_n$−M$_n$<RToA$_n$≦LARToA$_n$ OR LARToA$_n$<RToA$_n$≦ELERToA$_n$:

$\delta_{n+1} = \delta_n/2 + \delta_{min1/2}$ $ELERToA_{n+1} = MAX(ELERToA_n − \epsilon, RToA_n + \phi)$ There are different ways of calculating M$_{n+1}$:

M$_{n+1}$ Calculation Method I (the Best but also the most Complex):

$$M_{n+1} = M_{fix} + \alpha \times LARToA_{n+1}$$
$$= \{see\ below\ for\ LARToA_{n+1}\} =$$
$$= M_{fix} + \alpha \times MAX(RToA_n + M_{n+1} − \delta_{n+1}, MLRWS) \Rightarrow M_{n+1}$$
$$= MAX\begin{pmatrix} \frac{1}{1-\alpha} \times M_{fix} + \frac{\alpha}{1-\alpha} \times \\ (RToA_n − \delta_{n+1}), M_{fix} + \alpha \times MLRWS \end{pmatrix} \text{ where}$$
$$\frac{1}{1-\alpha} \times M_{fix} \text{ and } \frac{\alpha}{1-\alpha}$$

are constants that can be preconfigured or calculated once and for all in advance.

M$_{n+1}$ Calculation Method II, III, IV and V are the same as in Case 1.

The last step is to calculate LARToA$_{n+1}$:

$LARToA_{n+1} = MAX(RToA_n + M_{n+1} − \delta_{n+1}, MLRWS)$

Case 3, RToA$_n$>LARToA$_n$ AND RToA$_n$>ELERToA$_n$:

$\delta_{n+1} = \delta_n/2 + \delta_{min1/2} + f \times (RToA_n − MAX(LARToA_n, ELERToA_n))$ $ELERToA_{n+1} = RToA_n + \phi$ M$_{n+1}$ is Calculated in the same way as in Case 2.

$LARToA_{n+1} = MAX(RToA_n + M_{n+1} − \delta_{n+1}, MLRWS)$

Case 4, the frame does not arrive at all:

In this case RToA$_n$ is undefined. Set RToA$_n$=0 and choose to perform the calculations of case 1, case 2 or case 3 according to the normal criteria (which normally would result in that the calculations of case 1 are performed).

The following is a compact way of expressing timing algorithm 2 in the single-leg mode when relative times are used (using M$_{n+1}$ calculation method I in all cases):

---

IF (frame with CFN = n does not arrive) THEN RToA$_n$ = 0;
IF RToA$_n$ > LARToA$_n$ AND RToA$_n$ > ELERToA$_n$ THEN
  $\delta_{n+1} = \delta_n/2 + \delta_{min1/2} + f \times (RToA_n − MAX(LARToA_n, ELERToA_n))$
ELSE $\delta_{n+1} = \delta_n/2 + \delta_{min1/2}$;
ELERToA$_{n+1}$ = MAX(ELERToA$_n$ − $\epsilon$, RToA$_n$ + $\phi$);
IF RToA$_n$ > LARToA$_n$ − M$_n$ THEN
{

$$M_{n+1} = MAX\left(\frac{1}{1-\alpha} \times (M_{fix} + \alpha \times (RToA_n − \delta_{n+1})), M_{fix} + \alpha \times MLRWS\right);$$

LARToA$_{n+1}$ = MAX(RToA$_n$ + M$_{n+1}$ − $\delta_{n+1}$, MLRWS);
}
ELSE
{
LARToA$_{n+1}$ = MAX(LARToA$_n$ − $\delta_{n+1}$, MLRWS);
M$_{n+1}$ = M$_{fix}$ + $\alpha$ × LAToA$_{n+1}$;
};

---

When timing algorithm 2 is used in the all-leg mode there are only few differences from the above description. Like for timing algorithm I in the all-leg mode the ToA and RToA parameters are replaced by the ToAoLF (Time of Arrival of Last Frame) and RToAoLF (Relative Time of Arrival of Last Frame) parameters, which both refer to the arrival time of the last uplink frame with a certain CFN from any of the macro diversity legs to be combined (except the one across the radio link of the DHO node). In addition, the MLRWS parameter is replaced by the MRWS (Minimum Receive Window Size) parameter, which refer to the receive window for all macro diversity legs to be combined. Furthermore, in the all-leg mode the condition for case 4 becomes that none of the uplink frames arrive (including all macro diversity legs to be combined except the one across the DHO node's own radio interface). The rule for how to handle a LARToA$_{init}$ parameter signalled from the RNC is the same as for timing algorithm 1.

Timing Algorithm 3

Timing algorithm 3 is a simplification of timing algorithm 1 that results from setting f=0 in timing algorithm 1. A result from setting f=0, is that the $\delta$ parameter becomes a constant, i.e. $\delta = \delta_{min}$ for all CFNs, since f is a parameter that is used in the calculation of $\delta$ when a frame arrives with essential longer delay than previously arrived frames. If f=0, the $\delta$ can not be changed and it maintains its initial value accordingly. Another consequence is that case 2 and 3 in timing algorithm 1 are merged into one case in timing algorithm 3.

The compact expression of timing algorithm 3 in the single-leg mode when absolute times are used becomes as follows:

```
IF (frame with CFN = n does not arrive) THEN ToA_n = ref_n;
IF ToA_n > LAToA_n - M_n THEN
{
M_{n+1} =

= MAX( (1/(1-α)) × (M_fix + α × (ToA_n - δ_min - ref_n)), M_fix + α × MLRWS );

LAToA_{n+1} = MAX(ToA_n + TTI + M_{n+1} - δ_min, ref_{n+1} + MLRWS);
}
ELSE
{
LAToA_{n+1} = MAX(LAToA_n + TTI - δ_min, ref_{n+1} + MLRWS);
M_{n+1} = M_fix + α(LAToA_{n+1} - ref_{n+1});
};
```

The compact expression of timing algorithm 3 in the single-leg mode when relative times are used becomes as follows:

```
IF (frame with CFN = n does not arrive) THEN RToA_n = 0;
IF RToA_n > LARToA_n - M_n THEN
{

M_{n+1} = MAX( (1/(1-α)) × (M_fix + α × (RToA_n - δ_min)), M_fix + α × MLRWS );

LARToA_{n+1} = MAX(RToA_n + M_{n+1} - δ_min, MLRWS);
}
ELSE
{
LARToA_{n+1} = MAX(LARToA_n - δ_min, MLRWS);
M_{n+1} = M_fix + α × LARToA_{n+1};
};
```

The differences between the all-leg mode and the single-leg mode that were described for timing algorithm 1 also apply for timing algorithm 3.

Timing Algorithm 4

Timing algorithm 4 is not really an algorithm in the normal sense of the word. It uses fixed (non-adaptive) leg receive windows in contrast to the timing algorithms 1-3. Timing algorithm 4 is therefore not within the scope of the claims.

The leg receive window size (LRWS) for each DCH macro diversity leg can be either preconfigured, derived from DCH characteristics or signalled from the RNC. If signalled from the RNC, the LARToA_{init} parameter is used as the LRWS. The RNC can base the calculation of suitable LRWS/LAToA_{init} values on e.g. information in the topology database or possibly other information sources.

Assuming j macro diversity legs for a DCH (except the one across the DHO node's own radio interface) that are indexed 1-j. The size of the receive window (RWS), as defined by the latest allowed time of combining, is then equal to the greatest leg receive window, i.e. RWS=MAX(LRWS_1, . . . , LRWS_j).

There is no significant difference between the single-leg mode and the all-leg mode for this timing algorithm, but the algorithm may still behave differently for the different modes, if the leg receive windows for the different macro diversity legs are given different sizes. Furthermore, if the algorithm is used in the all-leg mode, a single fixed receive window is used for all macro diversity legs instead of a fixed leg receive window for each macro diversity leg.

Timing Algorithms for Non-Radio Active DHO Nodes

The uplink combining timing algorithms in this section are designed for non-radio active DHO nodes, e.g. non-radio active Node Bs or routers, but they may also be used in radio active DHO nodes.

With certain modifications timing algorithm 1, 2 and 3 (expressed with absolute times) can be adapted to non-radio active DHO nodes. The modifications that are needed are:

the LAToA_{init} parameter value has to be set differently, the MLRWS parameter cannot be used, most of the M (both M_{init} and M_{n+1}) calculation methods cannot be used (in essence M_{dynamic} cannot be calculated and therefore M=M_{fix}), and the actions for case 4 have to be modified (to adapt to the lack of time reference and to ensure that the relevant parameters in the all-leg mode are not adapted).

These modified timing algorithms are given the same number but with an "-NRA" suffix to indicate that they are adapted to Non-Radio Active DHO nodes.

When timing algorithms 1-NRA, 2-NRA and 3-NRA are used in the single-leg mode there is no limit to how far the leg receive window end advancing mechanism can advance the end of the leg receive window. This is due to the absence of the MLRWS parameter. Thus, if no frame arrives for a significant time period (with a consequent continuous advancing of the LAToA parameter), then when a frame subsequently arrives, the Δ parameter may be very large. For timing algorithms 1-NRA and 2-NRA this will result in an undesirably large δ parameter. Therefore, timing algorithms 1-NRA and 2-NRA should preferably be used in the all-leg mode.

Timing Algorithm 1-Non-Radio Active (NRA)

The timing algorithm is first described in the single-leg mode and then in the all-leg mode. The differences between the two modes are highlighted.

There is no natural time reference marking the beginning of the leg receive window in a non-radio active DHO node. Therefore it is not possible to express the timing algorithm using relative times. Another consequence is that the MLRWS parameter cannot be used.

Yet a consequence of the lack of time reference is that no LAToA_{init} parameter value can be set in advance, neither by the RNC nor by the non-radio active DHO node. Instead LAToA_{init} is set in relation to the arrival time of the first uplink frame that is received on the transport bearer of the concerned macro diversity leg of the concerned DCH after initiation of the DHO functionality. When the first uplink frame from any of the macro diversity legs arrive, the LAToA_{init} parameters of the other macro diversity legs are still undefined, which means that the latest allowed time of combining at that moment is defined by the only yet defined $\text{LAToA}_{init}$ parameter. To allow some time for the frames (with the same CFN) of the other macro diversity legs to arrive and be combined the $\text{LAToA}_{init}$ parameter is set to the arrival time of the first received uplink frame from the concerned macro diversity leg with an added margin, d. That is, assuming that the first received uplink frame from a macro diversity leg has a CFN=i then $\text{LAToA}_{init}=\text{LAToA}_i=\text{ToA}_i+d$, where $0 \leq d \leq M_{fix}$. If this received frame was the first frame to be received from any of the macro diversity legs, the latest allowed time of combining is set to $\text{LAToA}_{init}$. If subsequently a frame arrives from any of the other macro diversity legs before the latest allowed time of combining and the $\text{LAToA}_{init}$ parameter for this macro diversity leg is set to a later time than the latest allowed time of combining, then the latest allowed time of combining is adjusted to this later time. The d parameter may be preconfigured, derived from DCH characteristics or signalled from the RNC. When the timing algorithm is used in the single-leg mode and the d parameter is signalled from the RNC, the d parameter may be different for different macro diversity legs. Since only the initial set of frames is affected by the d parameter(s), the d parameter is not important and may be omitted for simplicity (which is equivalent to setting d=0).

Furthermore, since the calculation of $M_{dynamic}$ depends on time measurements in relation to a time reference (reg, the M parameter more or less has to be a fixed value, i.e. $M=M_{fix}$, which is the same for all CFNs for the same DCH macro diversity leg in a non-radio active DHO node.

However, $M_{fix}$ may be calculated for a specific DCH macro diversity leg in a certain non-radio active DHO node, which means that it may vary from one DCH macro diversity leg to another, from one DCH to another and from one non-radio active DHO node to another. If $M_{fix}$ is signalled from the RNC, it may be derived from information in the topology database (and/or possibly other information sources) in combination with DCH characteristics such as the QoS. Otherwise the non-radio active DHO node may calculate $M_{fix}$ based on the DCH characteristics signalled from the RNC. $M_{fix}$ may also be a preconfigured value. In any case it is recommended that $M_{fix} \gg \delta_{min}$.

The actions of case 4 also have to be changed, since there is no time reference value to set the ToA parameter to. Instead a non-radio active DHO node sets the ToA parameter to LAToA-M in case 4.

The following is a description of the resulting timing algorithm 1-NRA (with $M=M_{fix}$ for all CFNs).

For the first received frame (i.e. the initial frame with CFN=i):

$LAToA_i = ToA_i + d$ $\delta_{i+1} \delta_{min}$ $LAToA_{i+1} = ToA_i + TTI + M_{fix} - \delta_{i+1}$ For subsequent frames the same four cases are used as for timing algorithm 1:

Case 1: $\text{ToA}_n \leq \text{LAToA}_n - M_{fix}$

Case 2: $\text{LAToA}_n - M_{fix} < \text{ToA}_n \leq \text{LAToA}_n$

Case 3: $\text{ToA}_n > \text{LAToA}_n$

Case 4: The frame does not arrive at all, i.e. $\text{ToA}_n$ is undefined.

The calculations performed for the different cases are described below.

Case 1, $\text{ToA}_n \leq \text{LAToA}_n - M_{fix}$:

$\delta_{n+1} = \delta_n/2 + \delta_{min1/2}$ $LAToA_{n+1} = LAToA_n + TTI - \delta_{n+1}$ Case 2, $\text{LAToA}_n - M_{fix} < \text{ToA}_{dn} \leq \text{LAToA}_n$:

$\delta_{n+1} = \delta_n/2 + \delta_{min1/2}$ $LAToA_{n+1} = ToA_n + TTI + M_{fix} - \delta_{n+1}$ Case 3, $\text{ToA}_n > \text{LAToA}_n$:

$\delta_{n+1} = \delta_n/2 + \delta_{min1/2} + f \times \Delta_n$ $LAToA_{n+1} = ToA_n + TTI + M_{fix} - \delta_{n+1}$ Case 4, the frame does not arrive at all:

In this case $\text{ToA}_n$ is undefined. Assume that $\text{ToA}_n = \text{LAToA}_n - M_{fix}$ and perform the calculations of case 1.

The following is a compact way of expressing timing algorithm 1-NRA in the single-leg mode (for all but the first frame):

IF (frame with CFN=n does not arrive) THEN $\text{ToA}_n = \text{LAToA}_n - M_{fix}$;

$\Delta_n = ToA_n - LAToA_n$;

IF $\Delta_n > 0$ THEN $\delta_{n+1} = \delta_n/2 + \delta_{min1/2} + f \times \Delta_n$ ELSE $\delta_{n+1} = \delta_n/2 + \delta_{min1/2}$;

IF $\Delta_n > -M_n$ THEN $LAToA_{n+1} = ToA_n + TTI + M_{fix} - \delta_{n+1}$

ELSE $LAToA_{n+1} = LAToA_n + TTI - \delta_{n+1}$;

When timing algorithm 1-NRA is used in the all-leg the ToA parameter is replaced by the ToAoLF (Time of Arrival of Last Frame) parameter, which refers to the arrival time of the last uplink frame with a certain CFN from any of the macro diversity legs to be combined. The $\text{LAToA}_{init}$ parameter is set in the same manner as the latest allowed time of combining for the first set of frames is set for timing algorithm 1-NRA in the single-leg mode. That is, when the first frame arrives from any of the macro diversity legs (and assuming this frame has CFN=i), then $\text{LAToA}_{init} = \text{LAToA}_i = \text{ToA}_i + d$, which also consequently becomes the end of the initial receive window. If subsequently a frame with CFN=i arrives from any of the other macro diversity legs before the end of the receive window, the $\text{LAToA}_{init}/\text{LAToA}_i$ parameter (and consequently the end of the initial receive window) is adjusted accordingly.

Furthermore, in the all-leg mode the condition for case 4 becomes that none of the uplink frames arrive (including all macro diversity legs to be combined). None of the relevant parameters are adapted in case 4.

If signalling of the $M_{fix}$ parameter from the RNC is used, the RNC may or may not send an $M_{fix}$ parameter to a non-radio active DHO node using the timing algorithm in the all-leg mode, when adding a new leg to be combined in the non-radio active DHO node. The RNC may also send a new $M_{fix}$ parameter to a non-radio active DHO node whose combining procedure is not directly affected, because the delay of one of the existing macro diversity legs is affected by changes further down in the DHO node tree.

A description of timing algorithm 1-NRA in the all-leg mode follows below (with $\Delta_n = ToAoLF_n - LAToA_n$).

For the first received set of frames (i.e. the initial set of frames with CFN=i):

$\text{LAToA}_i$ is set as described above.

$\delta_{i+1} = \delta_{min}$ $LAToA_{i+1} = ToAoLF_i + TTI + M_{fix} - \delta_{i+1}$ For subsequent sets of frames the following four cases are considered for timing algorithm 1-NRA in the all-leg mode:

Case 1: $\text{ToAoLF}_n \leq \text{LAToA}_n - M_{fix}$

Case 2: $\text{LAToA}_n - M_{fix} < \text{ToAoLF}_n \leq \text{LAToA}_n$

Case 3: $\text{ToAoLF}_n > \text{LAToA}_n$

Case 4: No frame arrives from any of the macro diversity legs, i.e. $\text{ToAoLF}_n$ is undefined.

The calculations performed for the different cases are described below.

Case 1, $\text{ToAoLF}_n \leq \text{LAToA}_n - M_{fix}$:

$\delta_{n+1} = \delta_n/2 + \delta_{min1/2}$ $LAToA_{n+1} = LAToA_n + TTI - \delta_{n+1}$ Case 2, $\text{LAToA}_n - M_{fix} < \text{ToAoLF}_n \leq \text{LAToA}_n$:

$\delta_{n+1} = \delta_n/2 + \delta_{min1/2}$ $LAToA_{n+1} = ToAoLF_n + TTI + M_{fix} - \delta_{n+1}$ Case 3, $\text{ToAoLF}_n > \text{LAToA}_n$:

$\delta_{n+1} = \delta_n/2 + \delta_{min1/2} + f \times \Delta_n$ $LAToA_{n+1} = ToAoLF_n + TTI + M_{fix} - \delta_{n+1}$ Case 4, no frame arrives from any of the macro diversity legs:
In this case the relevant parameters should not be adapted in any way, i.e.

$\delta_{n+1} = \delta_n$ $LAToA_{n+1} = LAToA_n + TTI$

The following is a compact way of expressing timing algorithm 1-NRA in the all-leg mode (for all but the first set of frames):

```
IF (no frame with CFN = n arrives) THEN
{
  δ_{n+1} = δ_n;
  ToAoLF_n = LAToA_n - M_{fix};
}
ELSE
{
  Δ_n = ToAoLF_n - LAToA_n;
  IF Δ_n > 0 THEN δ_{n+1} = δ_n/2 + δ_{min1/2} + f × Δ_n
  ELSE δn+1 = δ_n/2 + δ_{min1/2};
  IF Δ_n > -M_n THEN LAToA_{n+1} = ToAoLF_n + TTI + M_{fix} - δ_{n+1}
  ELSE LAToA_{n+1} = LAToA_n + TTI - δ_{n+1};
};
```

Timing Algorithm 2-NRA

When modifying timing algorithm 2 to timing algorithm 2-NRA the same modification principles can be used as when modifying timing algorithm 1 into timing algorithm 1-NRA (including the setting of $\text{LAToA}_{init}$ and that $M = M_{fix}$ for all CFNs). The resulting timing algorithm is first described in the single-leg mode and then in the all-leg mode.

For the first received frame (i.e. the initial frame with CFN=i):

$LAToA_i = ToA_i + d$ $\delta_{i+1} = \delta_{min}$ $LAToA_{i+1} = ToA_i + TTI + M_{fix} - \delta_{i+1}$ $ELEToA_{i+1} = ToA_i + \phi + TTI$ For subsequent frames the same four cases are used as for timing algorithm 2:

Case 1: $\text{ToA}_n \leq \text{LAToA}_n - M_{fix}$

Case 2: $\text{LAToA}_n - M_{fix} < \text{ToA}_n \leq \text{LAToA}_n$ OR $\text{LAToA}_n < \text{ToA}_n \leq \text{ELEToA}_n$ Case 3: $\text{ToA}_n > \text{LAToA}_n$ AND $\text{ToA}_n > \text{ELEToA}_n$ Case 4: The frame does not arrive at all, i.e. $\text{ToA}_n$ is undefined.

The calculations performed for the different cases are described below.

Case 1, $\text{ToA}_n \leq \text{LAToA}_n - M_{fix}$:

$\delta_{n+1} = \delta_n/2 + \delta_{min1/2}$ $LAToA_{n+1} = LAToA_n + TTI - \delta_{n+1}$ $ELEToA_{n+1} = MAX(ELEToA_n - \epsilon, ToA_n + \phi) + TTI$ Case 2, $\text{LAToA}_n - M_{fix} < \text{ToA}_n \leq \text{LAToA}_n$ OR $\text{LAToA}_n < \text{ToA}_n \leq \text{ELEToA}_n$:

$\delta_{n+1} = \delta_n/2 + \delta_{min1/2}$ $LAToA_{n+1} = ToA_n + TTI + M_{fix} - \delta_{n+1}$ $ELEToA_{n+1} = MAX(ELEToA_n - \epsilon, ToA_n + \phi) + TTI$ Case 3, $\text{ToA}_n > \text{LAToA}_n$ AND $\text{ToA}_n > \text{ELEToA}_n$:

$\delta_{n+1} = \delta_n/2 + \delta_{min1/2} + f \times (ToA_n - MAX(LAToA_n, ELEToA_n))$ $LAToA_{n+1} = ToA_n + TTI + M_{fix} - \delta_{n+1}$ $ELEToA_{n+1} = ToA_n + \phi + TTI$ Case 4, the frame does not arrive at all:
In this case $\text{ToA}_n$ is undefined. Assume that $\text{ToA}_n = \text{LAToA}_n - M_{fix}$ and perform the calculations of case 1.

The following is a compact way of expressing timing algorithm 2-NRA in the single-leg mode (for all but the first frame):

IF (frame with CFN=n does not arrive) THEN $\text{ToA}_n = \text{LAToA}_n - M_{fix}$;

IF $\text{ToA}_n > \text{LAToA}_n$ AND $\text{ToA}_n > \text{ELEToA}_n$ THEN $\delta_{n+1} = \delta_n/2 + \delta_{min1/2} + f \times (ToA_n - MAX(LAToA_n, ELEToA_n))$ ELSE $\delta_{n+1} = \delta_n/2 + \delta_{min1/2}$;

$ELEToA_{n+1} = MAX(ELEToA_n - \epsilon, ToA_n + \phi) + TTI$;

IF $\text{ToA}_n > \text{LAToA}_n - M_n$ THEN $LAToA_{n+1} = ToA_n + TTI + M_{fix} - \delta_{n+1}$ ELSE $LAToA_{n+1} = LAToA_n + TTI - \delta_{n+1}$;

When timing algorithm 2-NRA is used in the all-leg the ToA parameter is replaced by the ToAoLF (Time of Arrival of Last Frame) parameter, which refers to the arrival time of the last uplink frame with a certain CFN from any of the macro diversity legs to be combined. The $\text{LAToA}_{init}$ parameter is set as described for timing algorithm 1-NRA in the all-leg mode. Furthermore, in the all-leg mode the condition for case 4 becomes that none of the uplink frames arrive (including all macro diversity legs to be combined). None of the relevant parameters are adapted in case 4.

If signalling of the $M_{fix}$ parameter from the RNC is used, the RNC may or may not send an $M_{fix}$ parameter to a non-radio active DHO node using the timing algorithm in the all-leg mode, when adding a new leg to be combined in the non-radio active DHO node. The RNC may also send a new $M_{fix}$ parameter to a non-radio active DHO node whose combining procedure is not directly affected, because the delay of one of the existing macro diversity legs is affected by changes further down in the DHO node tree.

A description of timing algorithm 2-NRA in the all-leg mode follows below (with $\Delta_n = \text{ToAoLF}_n - \text{LAToA}_n$).

For the first received set of frames (i.e. the initial set of frames with CFN=i):

$\text{LAToA}_i$ is set as described for timing algorithm 1-NRA in the all-leg mode.

$$\delta_{i+1} = \delta_{min}$$

$$LAToA_{i+1} = ToAoLF_i + TTI + M_{fix} - \delta_{i+1}$$

$$ELEToA_{i+1} = ToAoLF_i + \phi + TTI$$

For subsequent frames the same four cases are used as for timing algorithm 2:

Case 1: $\text{ToAoLF}_n \leq \text{LAToA}_n - M_{fix}$

Case 2: $\text{LAToA}_n - M_{fix} < \text{ToAoLF}_n \leq \text{LAToA}_n$ OR $\text{LAToA}_n < \text{ToAoLF}_n \leq \text{ELEToA}_n$ Case 3: $\text{ToAoLF}_n > \text{LAToA}_n$ AND $\text{ToAoLF}_n > \text{ELEToA}_n$ Case 4: No frame arrives from any of the macro diversity legs, i.e. $\text{ToAoLF}_n$ is undefined.

The calculations performed for the different cases are described below.

Case 1, $\text{ToAoLF}_n \leq \text{LAToA}_n - M_{fix}$:

$$\delta_{n+1} = \delta_n/2 + \delta_{min1/2}$$

$$LAToA_{n+1} = LAToA_n + TTI - \delta_{n+1}$$

$$ELEToA_{n+1} = MAX(ELEToA_n - \epsilon, ToAoLF_n + \phi) + TTI$$

Case 2, $\text{LAToA}_n - M_{fix} < \text{ToAoLF}_n \leq \text{LAToA}_n$ OR $\text{LAToA}_n < \text{ToAoLF}_n \leq \text{ELEToA}_n$:

$$\delta_{n+1} = \delta_n/2 + \delta_{min1/2}$$

$$LAToA_{n+1} = ToAoLF_n + TTI + M_{fix} - \delta_{n+1}$$

$$ELEToA_{n+1} = MAX(ELEToA_n - \epsilon, ToAoLF_n + \phi) + TTI$$

Case 3, $\text{ToAoLF}_n > \text{LAToA}_n$ AND $\text{ToAoLF}_n > \text{ELEToA}_n$:

$$\delta_{n+1} = \delta_n/2 + \delta_{min1/2} + f \times (ToAoLF_n - MAX(LAToA_n, ELEToA_n))$$

$$LAToA_{n+1} = ToAoLF_n + TTI + M_{fix} - \delta_{n+1}$$

$$ELEToA_{n+1} = ToAoLF_n + \phi + TTI$$

Case 4, no frame arrives from any of the macro diversity legs:

In this case the relevant parameters should not be adapted in any way, i.e.

$$\delta_{n+1} = \delta_n$$

$$LAToA_{n+1} = LAToA_n + TTI$$

$$ELEToA_{n+1} = ELEToA_n + TTI$$

The following is a compact way of expressing timing algorithm 2-NRA in the all-leg mode (for all but the first set of frames):

```
IF (no frame with CFN = n arrives) THEN
{
  δ_{n+1} = δ_n;
  LAToA_{n+1} = LAToA_n + TTI;
  ELEToA_{n+1} = ELEToA_n + TTI;
}
ELSE
{
  IF ToAoLF_n > LAToA_n AND ToAoLF_n > ELEToA_n THEN
    δ_{n+1} = δ_n/2 + δ_{min1/2} + f × (ToAoLF_n - MAX(LAToA_n, ELEToA_n))
  ELSE δ_{n+1} = δ_n/2 + δ_{min1/2};
  ELEToA_{n+1} = MAX(ELEToA_n - ε, ToAoLF_n + φ) + TTI;
  IF ToAoLF_n > LAToA_n - M_n THEN
    LAToA_{n+1} = ToAoLF_n + TTI + M_{fix} - δ_{n+1}
  ELSE LAToA_{n+1} = LAToA_n + TTI - δ_{n+1};
};
```

Timing Algorithm 3-NRA

When modifying the previously described timing algorithm 3 to timing algorithm 3-NRA the same modification principles can be used as when modifying the timing algorithms 1 and 2 into the timing algorithms 1-NRA and 2-NRA (including the setting of $\text{LAToA}_{init}$ and that $M = M_{fix}$ for all CFNs). The resulting timing algorithm is first described in the single-leg mode and then in the all-leg mode.

For the first received frame (i.e. the initial frame with CFN=i):

$$LAToA_i = ToA_i + d$$

$$LAToA_{i+1} = ToA_i + TTI + M_{fix} - \delta_{min}$$

Since tiring algorithm 3-NRA is merely a simplification of timing algorithm 1-NRA (i.e. timing algorithm 1-NRA with f=0), the rest of the algorithm is expressed only in compact form:

IF (frame with CFN=n does not arrive) THEN $\text{ToA}_n = \text{LAToA}_n - M_{fix}$;

IF $\text{ToA}_n > \text{LAToA}_n - M_{fix}$ THEN $\text{LAToA}_{n+1} = \text{ToA}_n + TTI + M_{fix} - \delta_{min}$ ELSE $\text{LAToA}_{n+1} = \text{LAToA}_n + TTI - \delta_{min}$;

The differences between the all-leg mode and the single-leg mode that were described for timing algorithm 1-NRA apply for timing algorithm 3-NRA too. A compact description of timing algorithm 3-NRA in the all-leg mode follows below.

For the first received set of frames (i.e. the initial set of frames with CFN=i):

$\text{LAToA}_i$ is set as described for timing algorithm 1-NRA in the all-leg mode.

$$LAToA_{i+1} = ToAoLF_i + TTI + M_{fix} - \delta_{min}$$

For subsequent sets of frames:

IF (no frame with CFN=n arrives) THEN $\text{LAToA}_{n+1} = \text{LAToA}_n + TTI$ ELSE IF $\text{ToAoLF}_n > \text{LAToA}_n - M_{fix}$ THEN $\text{LAToA}_{n+1} = \text{ToAoLF}_n + TTI + M_{fix} - \delta_{min}$ ELSE $\text{LAToA}_{n+1} = \text{LAToA}_n + TTI - \delta_{min}$;

Timing Algorithm 4-NRA

Timing algorithm 4-NRA is used only in the all-leg mode. A single-leg mode adaptation of the algorithm is conceivable, but it is not described in the present application.

In the following description of timing algorithm 4-NRA, the CFNs are numbered CFN0, CFN1, CFN2, ... CFNn, CFNn+1, .... Parameters corresponding to the CFNs have the corresponding indexes.

In general, if all the candidate frames for CFNn arrive before LAToAn, the DHO node combines them and sends the result without waiting until LAToAn. If not all candidate frames for CFNn have arrived at LAToAn, the DHO node combines the candidate frames that it has received and sends the result. If only one candidate frame is received, that frame will be forwarded unchanged. If no frame is received, nothing is sent.

When the first uplink frame that is subject for combination arrives at time $t_0$, the DHO node sets the LAToA for the CFN, CFN0, of the received frame $t_0+\Delta$ (this LAToA is denoted $LAToA_0$, i.e. $LAToA_0=t_0+\Delta$), where $\Delta$ is a fraction of the TTI. Note that the parameter $\Delta$ has a different meaning in this timing algorithm than in the previously described timing algorithms.

The below stated general rules for subsequent CFNs are divided into two different cases:

1. All candidate frames for $CFN_n$ arrive before $LAToA_n$.
   In this case, if the time of arrival of the last combined frame for $CFN_n$, $ToAoLCF_n$, was later than, or equal to, $LAToA_n-\Delta$, i.e. $LAToA_n-\Delta \leq ToAoLCF_n \leq LAToA_n$, then $LAToA_{n+1}$ is set to $LAToA_{n+1}=ToAoLCF_n+TTI+\Delta$. Otherwise, if the last combined frame arrived before $LAToA_n-\Delta$, i.e. $ToAoLCF_n<LAToA_n-\Delta$, $LAToA_{n+1}$ is set to $LAToA_{n+1}=LAToA_n+TTI-\delta$, where $\delta$ is a fraction of $\Delta$. Note that the parameter $\delta$ has a different meaning in this timing algorithm than in the previously described timing algorithms. According to another embodiment, an additional rule to this general rule is that if $LAToA-\Delta-\delta<ToAoLCF_n \leq LAToA-\Delta$, then $LAToA_{n+1}$ is set to $LAToA_{n+1}=LAToA_n+TTI$.

2. Not all candidate frames for $CFN_n$ arrive before $LAToA_n$.
   In the second case, when not all the candidate frames for CFNn have arrived at $LAToA_n$, the DHO node will set $LAToA_{n+1}$ based on the time of arrival of the last combined frame for $CFN_n$, $ToAoLCF_n$. If $ToALCF_n$ was later than, or equal to, $LAToA_n-\Delta$ (i.e. $LAToA_n-\Delta \leq ToALCF_n \leq LAToA_n$), then $LAToA_{n+1}$ is set to $LAToA_{n+1}=ToAoLCF_n+TTI+\Delta$. Otherwise, if the last combined frame arrived before $LAToA_n-\Delta$ (i.e. $ToAoLCF_n<LAToA_n-\Delta$) or if no candidate frame at all was received, $LAToA_{n+1}$ is set to $LAToA_{n+1}=LAToA_n+TTI$. If subsequently a candidate frame for $CFN_n$ is received after $LAToA_n$ at the time of $ToALUF_n$ (i.e. time of arrival of late uncombined frame for $CFN_n$), $LAToA_{n+1}$ will be set to $LAToA_{n+1}=ToAoLUF_n+TTI+\Delta$. As for the treatment of the actual late uncombined frame, the DHO node has two options: it could forward it unchanged or discard it. Preferably, the DHO node should discard it in order to not waste bandwidth and not to confuse a possible second combining DHO node further along the uplink.

Figure 7:
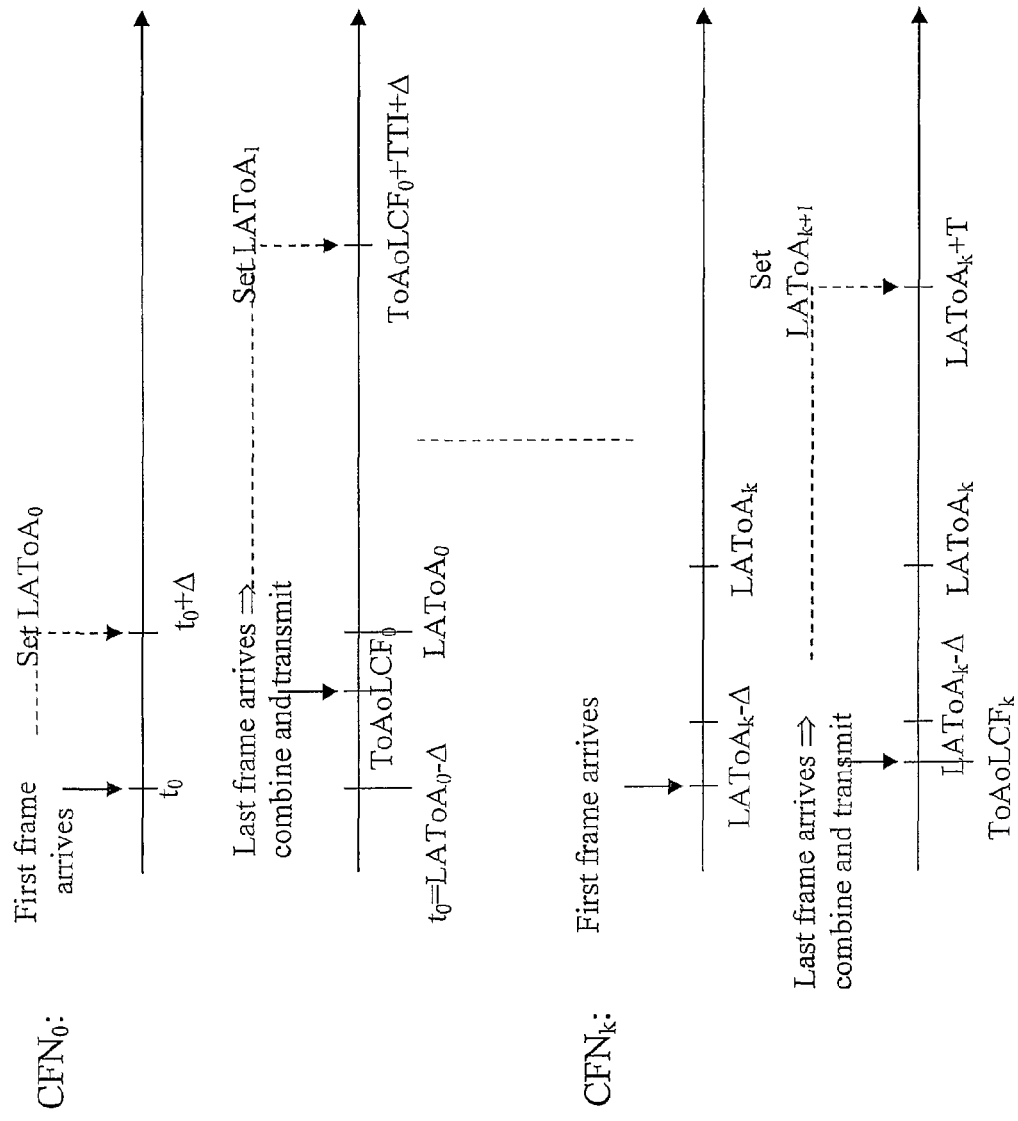
FIG. 7 and FIG. 8 illustrate schematically the combining timing scheme according to one embodiment.
Figure 8:
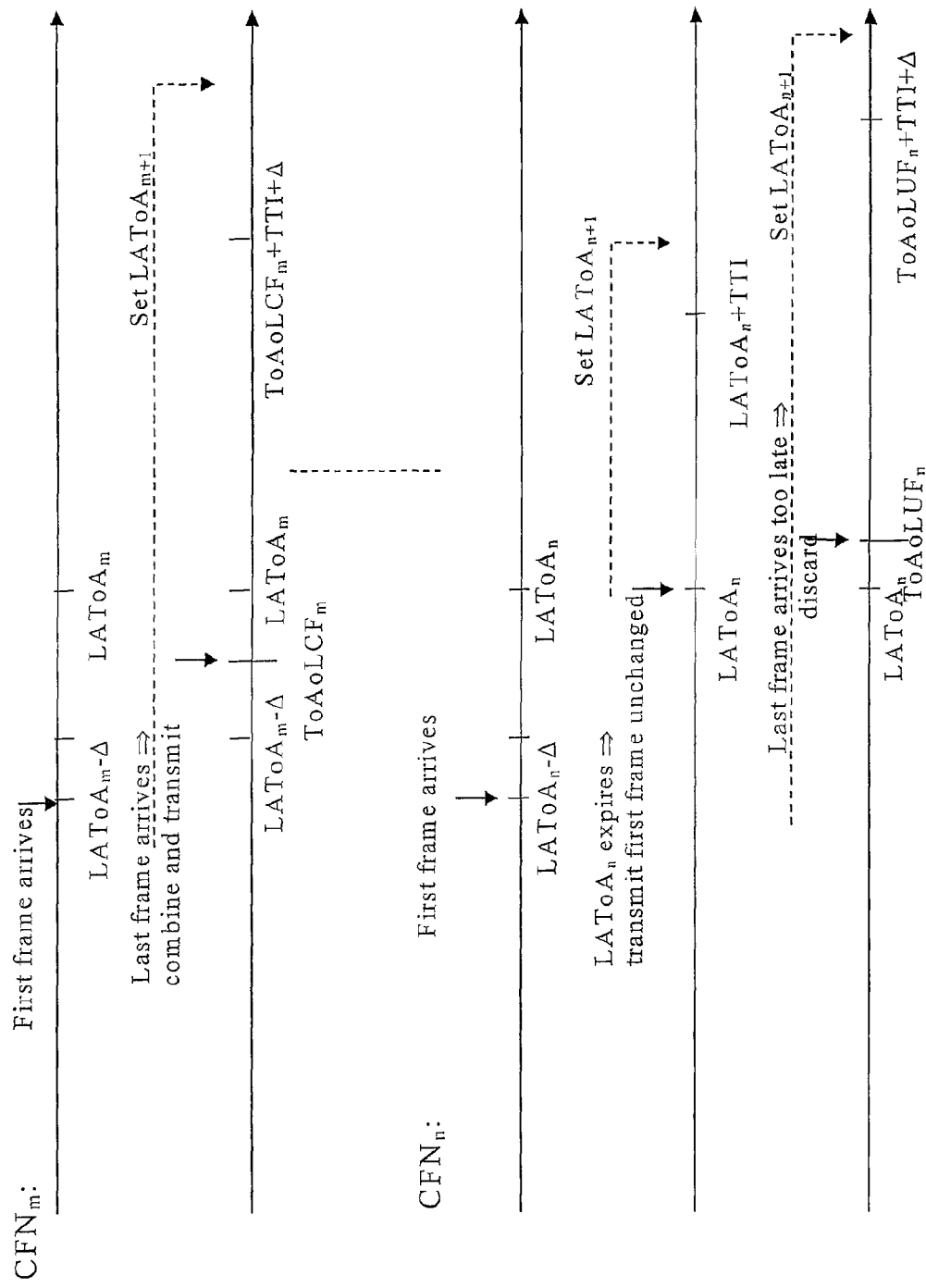

The described combining timing scheme is illustrated in FIGS. 7 and 8. An example of preferred values of $\Delta$ and $\delta$ are $\delta=10$ µs and $\Delta=250$ µs.

Timing algorithm 4-NRA results in that the DHO node adapts the LAToA to the maximum delay that a frame can experience on the path between the Node B and the combining DHO node, whenever a frame arrives later than expected, the DHO node adjusts the next LAToA. This is what is desired assuming that no frames are subject to larger transport delays than the QoS of the bearer allows. To recover from abnormally delayed frames and to handle clock drifts (between nodes whose clocks are not synchronised with each other), there is also a slow adaptation in the other direction (i.e. adjusting the next LAToA earlier in time) when all the candidate frames arrive early. $\delta$ is used for this purpose.

One way to reduce the need for an adaptive timing algorithm is to ensure that the Node B always sends a frame even when there is no correctly received data to send even when the DCH FP silent mode and DTX are used. It would then use a TFI indicating TBs of zero length, or even more preferred, send a frame consisting of only the CFN. In the latter case, the resulting IP packet, with header compression applied, would consist of only five bytes. With this function in place a combining DHO node could always wait for all the expected candidate frames to arrive before combining the frames instead of using an adaptive timing algorithm.

Figure 11:
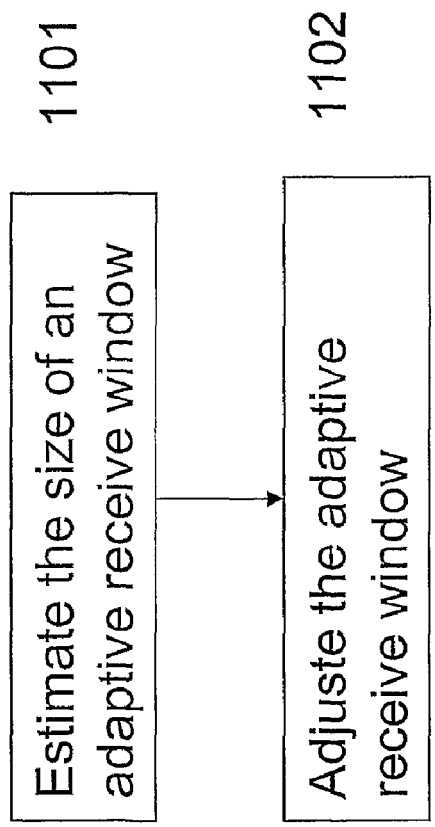
FIG. 11 is a flowchart of method.

The method illustrated in the flowchart of FIG. 11 for executing a macro diversity functionality in a mobile telecommunication system comprising the step of performing an uplink combining of Dedicated Channel, DCH, frames comprises the steps of estimating the size of an adaptive receive window for receiving said DCH frames, wherein the adaptive receive window comprises a starting point, denoted ref, and an end point for receiving a next DCH frame or a next set of DCH frames to be combined having a Connection Frame Number n, $CFN_n$, based on the Time of Arrival, ToA, of a previous frame or a previous set of frames having a $CFN_{n-1}$, and adjusting the adaptive receive window by changing its end point for a new frame or a new set of frames in accordance with the estimated size.

The method may as described above be implemented in one or more DHO nodes. Furthermore, the method and thus functionality of the RNC, the Node Bs and the routers and possible other types of nodes acting as DHO nodes used in the present invention may be implemented by a computer program product. The computer program product is directly loadable into the internal memory of a computer within one or more nodes, in the mobile telecommunication network, comprising the software code portions for performing the steps of the method. The computer program product is further stored on a computer usable medium, comprising a readable program for causing a computer, within a router, server, RNC or Node B or other type of node comprising DHO functionality in the mobile telecommunication network, to control an execution of the steps of the method.

In the drawings and specification, there have been disclosed typical preferred example embodiments and, although specific terms are employed, they are used in a generic and descriptive sense only and not for purposes of limitation. The scope of the invention is set forth in the following claims.

The invention claimed is:

1. A Diversity Handover, DHO, node adapted to execute a macro diversity functionality in a mobile telecommunication system wherein said DHO node comprises electronic circuitry configured to:

perform an uplink combining of Dedicated Channel, DCH, frames, estimate the size of an adaptive receive window for receiving said DCH frames, the adaptive receive window including a starting point, denoted ref, and an end point for receiving a next DCH frame or a next set of DCH frames to be combined having a Connection Frame Number n, $CFN_n$, based on the Time of Arrival, ToA, of a previous frame or a previous set of frames having a $CFN_{n-1}$, and adjust the adaptive receive window by changing its end point for a new frame or a new set of frames in accordance with the estimated size.

2. The DHO node according to claim 1, wherein the receive window has an allowed minimum size.

3. The DHO node according to claim 1, wherein the end point of the adaptive receive window for DCH frame n or set of DCH frames n is set to a time distance of M from a latest expected ToA of DCH frame n or set of DCH frames n.

4. The DHO node according to claim 3, wherein M is adaptive and depends on the estimated size of the receive window.

5. The DHO node according to claim 1, wherein the size adjustment of the adaptive receive window is controllable by a receive window end advancing step parameter adapted to slowly reduce the size of the receive window when the frame or set of frames arrives before the end of the receive window.

6. The DHO node according to claim 5, wherein the receive window end advancing step parameter is a constant value.

7. The DHO node according to claim 5, wherein the receive window end advancing step parameter depends on the ToA of the current DCH frame or the last frame of a set of DCH frames when the current DCH frame or the last frame of a set of DCH frames arrives after the end point.

8. The DHO node according to claim 1, wherein the DHO node comprises means for receiving an initial end point of the receive window from the RNC.

9. The DHO node according to claim 8, wherein the received initial end point is used as a starting point for a first frame or set of frames to be combined.

10. The DHO node according to claim 1, wherein the DHO node comprises means for preconfiguring an initial end point.

11. The DHO node according to claim 1, wherein the end point of the receive window is extended to an extended end point in order to counteract the speed of the receive window end advancing parameter when DCH frames arrive relatively frequently after the end point but before the extended end point.

12. The DHO node according to claim 1, wherein the specified times are relative times.

13. The DHO node according to claim 1, wherein an initial end point is set to the ToA of the first uplink DCH frame from a macro diversity leg with an added margin d.

14. The DHO node according to claim 3, wherein M is fixed and the DHO node comprises means for receiving M from the RNC.

15. The DHO node according to claim 3, wherein M is fixed and preconfigured.

16. The DHO node according to claim 1, wherein the ToA is replaced by a Time of Arrival of the Last Frame of a set of frames to be combined and said receive window is calculated as a common receive window for all legs.

17. The DHO node according to claim 12, wherein the relative ToA is replaced by a relative Time of Arrival of the Last Frame of a set of frames to be combined and said receive window is being calculated as a common receive window for all legs.

18. A method for executing a macro diversity functionality in a mobile telecommunication system comprising:

performing, in a diversity handover node, an uplink combining of Dedicated Channel, DCH, frames, including steps of:

estimating the size of an adaptive receive window for receiving said DCH frames, wherein the adaptive receive window comprises a starting point, denoted ref, and an end point for receiving a next DCH frame or a next set of DCH frames to be combined having a Connection Frame Number n, $CFN_n$, based on the Time of Arrival, ToA, of a previous frame or a previous set of frames having a $CFN_{n-1}$, and adjusting the adaptive receive window by changing its end point for a new frame or a new set of frames in accordance with the estimated size.

19. The method according to claim 18, wherein the receive window has an allowed minimum size.

20. The method according to claim 18, wherein the method comprises the further step of:

setting the end point of the adaptive receive window for DCH frame n or set of DCH frames n to a time distance of M from a latest expected ToA of DCH frame n or set of DCH frames n.

21. The method according to claim 20, wherein the M is adaptive and depends on the estimated size of the receive window.

22. The method according to claim 18, wherein the method comprises the further step of:

controlling the size adjustment of the adaptive receive window by a receive window end advancing step parameter adapted to slowly reduce the size of the receive window when the frame or set of frames arrives before the end of the receive window.

23. The method according to claim 22, wherein the receive window end advancing step parameter is a constant value.

24. The method according to claim 23, wherein the receive window end advancing step parameter depends on the ToA of the current DCH frame or the last frame of a set of DCH frames when the current DCH frame or the last frame of a set of DCH frames arrives after the end point.

25. The method according to claim 18, wherein the method comprises the further step of:

receiving an initial end point of the receive window from the RNC.

26. The method according to claim 25, wherein the method comprises the further step of:

using the received initial end point as a starting point for a first frame or set of frames to be combined.

27. The method according to claim 18, wherein the method comprises the further step of:

preconfiguring an initial end point.

28. The method according to claim 18, wherein the method comprises the further step of:

extending the end point of the receive window to an extended end point in order to counteract the speed of the receive window end advancing parameter when DCH frames arrive relatively frequently after the end point but before the extended end point.

29. The method according to claim 18, wherein the specified times are relative times.

30. The method according to claim 18, wherein the method comprises the further step of:

setting an initial end point to the ToA of the first uplink DCH frame from a macro diversity leg with an added margin d.

31. The method according to claim 20, wherein M is fixed and the method comprises the further step of:

receiving M from the RNC.

32. The method according to claim 20, wherein M is fixed and preconfigured.

33. The method according to claim 18, wherein the method comprises the further step of:

replacing the ToA by a Time of Arrival of the Last Frame of a set of frames to be combined and calculating said receive window as a common receive window for all legs.

34. The method according to claim 29, wherein the method comprises the further step of:

replacing the relative ToA by a relative Time of Arrival of the Last Frame of a set of frames to be combined and calculating said receive window as a common receive window for all legs.

35. A computer readable storage medium comprising a computer readable program which when executed by a computer within a Diversity Handover node in a mobile telecommunication system, causes the computer execute the steps of claim 18.

* * * * *

UNITED STATES PATENT AND TRADEMARK OFFICE
CERTIFICATE OF CORRECTION

PATENT NO. : 7,869,405 B2  
APPLICATION NO. : 10/583617  
DATED : January 11, 2011  
INVENTOR(S) : Rune Page 1 of 2

It is certified that error appears in the above-identified patent and that said Letters Patent is hereby corrected as shown below:

In the Drawings

In Fig. 9, Sheet 9 of 11, delete "cIoses." and insert -- closes. --, therefor.

In the Specification

In Column 6, Line 9, delete "itself." and insert -- itself). --, therefor.

In Column 7, Line 11, delete "itself." and insert -- itself). --, therefor.

In Column 11, Line 17, delete " $ToA_n \leq LATiA_n - M_n$ " and insert -- $ToA_n \leq LAToA_n - M_n$ --, therefor.

In Column 13, Line 29, delete "Method IV." and insert -- Method IV: --, therefor.

In Column 13, Line 63, delete " $LARToA_{n+1} = MAX(RToA_n + M_{n+1}, MLRWS)$ " and insert -- $LARToA_{n+1} = MAX(RToA_n + M_{n+1} - \delta_{n+1}, MLRWS)$ --, therefor.

In Column 15, Line 19, delete " $\varepsilon = \varepsilon_{min}/\varepsilon$ " and insert -- $\varepsilon = \delta_{min}/\delta$ --, therefor.

In Column 15, Line 41, delete " $ELEToA_{n+1} = MAX(ELEToA_n, \delta, ToA_n + \varphi) + TTI$ " and insert -- $ELEToA_{n+1} = MAX(ELEToA_n - \varepsilon, ToA_n + \varphi) + TTI$ --, therefor.

Signed and Sealed this  
Twentieth Day of May, 2014

Michelle K. Lee  
*Deputy Director of the United States Patent and Trademark Office*

CERTIFICATE OF CORRECTION (continued)
U.S. Pat. No. 7,869,405 B2

In Column 15, Line 66, delete "$ELEToA_{n+1}=MAX(ELEToA_{nn}-\varepsilon.ToA_n+\varphi)+TTI$" and insert -- $ELEToA_{n+1} = MAX(ELEToA_n - \varepsilon, ToA_n + \varphi) + TTI$ --, therefor.

In Column 16, Lines 6-7, delete "$= \{see\ below\ for\ LARToA_{n+1}\} = $" and insert -- $M_{n+1} = M_{fix} + \alpha(LAToA_{n+1} - ref_{n+1}) = \{see\ below\ for\ LAToA_{n+1}\} =$ --, therefor.

In Column 17, Line 13, delete "$ELERToA_{n+1}=MAX(ELERToA_n-\delta, RToA_n+\varphi)$" and insert -- $ELERToA_{n+1} = MAX(ELERToA_n - \varepsilon, RToA_n + \varphi)$ --, therefor.

In Column 17, Line 19, delete "Method II." and insert -- Method II: --, therefor.

In Column 17, Line 23, delete "Method III." and insert -- Method III: --, therefor.

In Column 17, Line 29, delete "Method V." and insert -- Method V: --, therefor.

In Column 18, Line 36, delete "algorithm I" and insert -- algorithm 1 --, therefor.

In Column 21, Line 23, delete "(reg," and insert -- (ref), --, therefor.

In Column 22, Line 1, delete "$LAToA_n-M_{fix}<ToA_{dn}\leq LAToA_n:$" and insert -- $LAToA_n-M_{fix}<ToA_n\leq LAToA_n:$ --, therefor.

In Column 26, Line 36, delete "tiring" and insert -- timing --, therefor.